United States Patent
Luski et al.

(10) Patent No.: US 10,050,313 B2
(45) Date of Patent: *Aug. 14, 2018

(54) LITHIUM ION BATTERY

(71) Applicants: GM GLOBAL TECHNOLOGY OPERATIONS LLC, Detroit, MI (US); Bar-Ilan University, Ramat Gan (IL)

(72) Inventors: Shalom Luski, Rehovot (IL); Doron Aurbach, Bnei Brak (IL); Bob R. Powell, Jr., Birmingham, MI (US); Ion C. Halalay, Grosse Pointe Park, MI (US); Timothy J. Fuller, Pittsford, NY (US); Anjan Banerjee, West Bengal State (IN); Baruch Ziv, Ramat-Gan (IL); Yuliya Shilina, Bat Yam (IL)

(73) Assignees: GM GLOBAL TECHNOLOGY OPERATIONS LLC, Detroit, MI (US); BAR-ILAN UNIVERSITY, Ramat Gan (IL)

( * ) Notice: Subject to any disclaimer, the term of this patent is extended or adjusted under 35 U.S.C. 154(b) by 19 days.

This patent is subject to a terminal disclaimer.

(21) Appl. No.: 15/186,526

(22) Filed: Jun. 19, 2016

(65) Prior Publication Data
US 2017/0365883 A1    Dec. 21, 2017

(51) Int. Cl.
H01M 10/42 (2006.01)
H01M 2/16 (2006.01)
H01M 10/0525 (2010.01)

(52) U.S. Cl.
CPC ....... H01M 10/4235 (2013.01); H01M 2/166 (2013.01); H01M 2/1653 (2013.01); H01M 10/0525 (2013.01)

(58) Field of Classification Search
CPC ......... H01M 10/0525; H01M 10/4235; H01M 2/1653; H01M 2/166; H01M 4/131;
(Continued)

(56) References Cited

U.S. PATENT DOCUMENTS

| 4,530,963 A | 7/1985 | DeVoe et al. |
| 4,670,363 A | 6/1987 | Whitney et al. |

(Continued)

FOREIGN PATENT DOCUMENTS

| CN | 102130361 A | 7/2011 |
| CN | 102447111 A | 5/2012 |

(Continued)

OTHER PUBLICATIONS

Walkowiak, et al., Macrocycle Carriers for Separation of Metal Ions in Liquid Membrane Process—A Review, Desalination 240, 1999, pp. 186-197.

(Continued)

*Primary Examiner* — Carlos Barcena
(74) *Attorney, Agent, or Firm* — Harness, Dickey & Pierce, P.L.C.

(57) ABSTRACT

A lithium ion battery includes a positive and a negative electrode, and a nanoporous or microporous polymer separator soaked in electrolyte solution and disposed between the electrodes. At least two different chelating agents are included and selected to complex with: i) two or more different transition metal ions; ii) a transition metal ion in two or more different oxidation states; or iii) both i) and ii). The at least two different selected chelating agents are to complex with transition metal ions in a manner sufficient to not affect movement of lithium ions across the separator during operation of the battery. The chelating agents are: dissolved or dispersed in the electrolyte solution; grafted onto the polymer of the separator; attached to the binder (Continued)

material of the negative and/or positive electrode; disposed within pores of the separator; coated on a surface of the separator; and/or coated on a surface of an electrode.

22 Claims, 11 Drawing Sheets

(58) Field of Classification Search
CPC ...... H01M 4/133; H01M 4/505; H01M 4/525; H01M 4/587; H01M 4/623; H01M 4/625
See application file for complete search history.

(56) References Cited

U.S. PATENT DOCUMENTS

| | | | |
|---|---|---|---|
| 5,130,211 A | 7/1992 | Wilkinson | |
| 6,689,513 B1 | 2/2004 | Morigaki et al. | |
| 7,022,812 B2 | 4/2006 | Yoshimura et al. | |
| 7,282,109 B2 | 10/2007 | Takata et al. | |
| 8,349,031 B2 | 1/2013 | Take et al. | |
| 8,455,140 B1 | 6/2013 | Huang et al. | |
| 8,460,591 B2 | 6/2013 | Huang et al. | |
| 8,460,829 B1 | 6/2013 | Huang et al. | |
| 8,470,468 B2 | 6/2013 | Xiao et al. | |
| 8,470,898 B2 | 6/2013 | Huang | |
| 8,568,930 B2* | 10/2013 | Halalay | H01M 2/1653 429/249 |
| 8,663,840 B2 | 3/2014 | Nazri et al. | |
| 8,765,301 B2 | 7/2014 | Halalay et al. | |
| 8,785,054 B2 | 7/2014 | Halalay et al. | |
| 8,835,058 B2 | 9/2014 | Kia et al. | |
| 8,951,654 B2 | 2/2015 | Sachdev et al. | |
| 8,974,946 B2 | 3/2015 | Cai et al. | |
| 8,993,646 B2 | 3/2015 | Huang | |
| 8,999,584 B2 | 4/2015 | Jiang et al. | |
| 9,023,520 B2 | 5/2015 | Halalay et al. | |
| 9,028,565 B2 | 5/2015 | Huang | |
| 9,077,038 B2 | 7/2015 | Halalay et al. | |
| 9,093,705 B2 | 7/2015 | Xiao et al. | |
| 9,123,939 B2 | 9/2015 | Xiao et al. | |
| 9,130,231 B2 | 9/2015 | Halalay et al. | |
| 9,138,932 B2 | 9/2015 | Huang | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,172,075 B2 | 10/2015 | Kia et al. | |
| 9,287,540 B2 | 3/2016 | Huang | |
| 9,324,984 B2 | 4/2016 | Huang et al. | |
| 9,331,323 B2 | 5/2016 | Huang | |
| 9,346,066 B2 | 5/2016 | Huang | |
| 9,350,046 B2 | 5/2016 | Huang | |
| 9,362,542 B2 | 6/2016 | Halalay et al. | |
| 9,362,551 B2 | 6/2016 | Sachdev et al. | |
| 9,362,552 B2 | 6/2016 | Sohn et al. | |
| 9,406,971 B2 | 8/2016 | Kia et al. | |
| 9,412,986 B2 | 8/2016 | Huang | |
| 9,455,430 B2 | 9/2016 | Huang et al. | |
| 9,525,600 B1 | 12/2016 | Shen | |
| 9,537,144 B2 | 1/2017 | Huang et al. | |
| 9,799,916 B2 | 10/2017 | Halalay et al. | |
| 2006/0194118 A1 | 8/2006 | Yew et al. | |
| 2010/0143769 A1 | 6/2010 | Lee et al. | |
| 2010/0239900 A1 | 9/2010 | Take et al. | |
| 2011/0117413 A1 | 5/2011 | Wang et al. | |
| 2011/0151333 A1 | 6/2011 | Halalay et al. | |
| 2011/0165459 A1 | 7/2011 | Halalay et al. | |
| 2011/0200863 A1 | 8/2011 | Xiao et al. | |
| 2012/0102725 A1 | 5/2012 | Fuller et al. | |
| 2012/0156568 A1 | 6/2012 | Kia et al. | |
| 2012/0229096 A1 | 9/2012 | Nazri | |
| 2012/0231321 A1 | 9/2012 | Huang et al. | |
| 2012/0308872 A1 | 12/2012 | Huang | |
| 2012/0309860 A1 | 12/2012 | Huang | |
| 2012/0315384 A1 | 12/2012 | Abd Elhamid et al. | |
| 2013/0004857 A1 | 1/2013 | Kia et al. | |
| 2013/0052509 A1 | 2/2013 | Halalay et al. | |
| 2013/0115519 A1 | 5/2013 | Lee et al. | |
| 2013/0130093 A1 | 5/2013 | Wang et al. | |
| 2013/0131200 A1 | 5/2013 | Huang | |
| 2013/0183582 A1 | 7/2013 | Halalay et al. | |
| 2013/0284338 A1 | 10/2013 | Xiao et al. | |
| 2013/0319599 A1 | 12/2013 | Huang | |
| 2014/0220233 A1 | 8/2014 | Huang et al. | |
| 2014/0242452 A1 | 8/2014 | Pieczonka et al. | |
| 2014/0272526 A1 | 9/2014 | Huang | |
| 2014/0272558 A1 | 9/2014 | Xiao et al. | |
| 2015/0014890 A1 | 1/2015 | Xiao | |
| 2015/0037651 A1 | 2/2015 | Huang | |
| 2015/0056492 A1 | 2/2015 | Huang | |
| 2015/0093626 A1 | 4/2015 | Fuller et al. | |
| 2015/0093628 A1* | 4/2015 | Halalay | H01M 2/1686 429/145 |
| 2015/0093639 A1 | 4/2015 | Halalay et al. | |
| 2016/0111721 A1 | 4/2016 | Xiao et al. | |
| 2017/0155175 A1 | 6/2017 | Halalay et al. | |

FOREIGN PATENT DOCUMENTS

| | | |
|---|---|---|
| CN | 102668171 A | 9/2012 |
| CN | 104518190 A | 4/2015 |
| CN | 106816626 A | 6/2017 |
| DE | 102014113894 A1 | 4/2015 |
| DE | 102016122403 A1 | 6/2017 |
| JP | S59031571 A | 2/1984 |
| WO | WO-2017120884 A1 | 7/2017 |

OTHER PUBLICATIONS

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

(56) References Cited

OTHER PUBLICATIONS

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

Smid, J., et al., "Synthesis of 4'-Vinylbenzocrown Ethers", Organic Preparations and Procedures Int. 8(4), 1976, pp. 193-196.

Anjan Banerjee et al.; "Increasing the durability of Li-ion batteries by means of manganese ion trapping materials with nitrogen functionalities"; Journal of Power Sources 341 (2017); pp. 457-465.

Anjan Banerjee et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials; 2016; 9 pages.

Anjan Banerjee, et al.; "Review—Multifunctional Materials for Enhanced Li-Ion Batteries Durability: A Brief Review of Practical Options"; Journal of the Electrochemical Society, 164 (1); Jan. 5, 2017; pp. A6315-A6323.

Ziv, et al. "Manganese Sequestration and Li-Ion Batteries Durability Enhancement by Polymeric 18-Crown-6 Ethers"; Journal of the Electrochemical Society, 161 (9); May 21, 2014; pp. A1213-1217.

Halalay et al.; U.S. Appl. No. 15/644,436, filed Jul. 7, 2017 entitled "Iron Ion Trapping Van Der Waals Gripper Additives for Electrolyte Systems in Lithium-Ion Batteries"; 54 pages.

Luski et al.; U.S. Appl. No. 15/186,525, filed Jun. 19, 2016 entitled "Lithium Ion Battery"; 65 pages.

Wu et al.; U.S. Appl. No. 15/644,444, filed Jul. 7, 2017 entitled "Electrolyte System Suppressing or Minimizing Metal Contaminants and Dendrite Formation in Lithium Ion Batteries"; 45 pages.

Halalay et al.; U.S. Appl. No. 15/644,422, filed Jul. 7, 2017 entitled "Polymeric Ion Traps for Suppressing or Minimizing Transition Metal Ions and Dendrite Formation or Growth in Lithium-Ion Batteries"; 43 pages.

First Office Action for Chinese Application No. 201410642253.9 dated May 24, 2016; 7 pages.

\* cited by examiner

LITHIUM ION BATTERY

TECHNICAL FIELD

The present disclosure relates generally to lithium ion batteries.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general lack of any memory effect when compared to other kinds of rechargeable batteries, a relatively low internal resistance, and a low self-discharge rate when not in use. The ability of lithium batteries to undergo repeated charging-discharging cycling over their useful lifetimes makes them an attractive and dependable electrical energy source.

SUMMARY

A lithium ion battery includes a positive electrode including a binder material, a negative electrode including a binder material, and a nanoporous or microporous polymer separator soaked in an electrolyte solution, the nanoporous or microporous polymer separator being operatively disposed between the positive electrode and the negative electrode. At least two different chelating agents are included in the battery and selected to complex with: i) two or more different transition metal ions; ii) a transition metal ion in two or more different oxidation states; or iii) both i) and ii). The at least two different selected chelating agents complex with transition metal ions in a manner sufficient to not affect movement of lithium ions across the nanoporous or microporous polymer separator during operation of the lithium ion battery. The chelating agents are at least one of: dissolved in the electrolyte solution; grafted onto the polymer of the nanoporous or microporous polymer separator as a substitute pendant group; operatively disposed within pores of the separator; attached to the binder material of the negative electrode; attached to the binder material of the positive electrode; coated on a surface of the separator; coated on a surface of the negative electrode; and coated on a surface of the positive electrode. The at least two different chelating agents are selected from: ion traps in molecular form selected from the group consisting of polyamines, thiols, and alkali metal salts of organic acids; polymers functionalized with alkali metal salts of organic acids; polymers functionalized with nitrogen-containing chemical groups; polymers functionalized with two or more functional groups; and polymers functionalized with cyclic structures selected from the group consisting of crown ethers, aza-crown ethers, cryptands, lariat ethers, calixarenes, calixcrowns, and combinations thereof.

BRIEF DESCRIPTION OF THE DRAWINGS

Features of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

Figure 4:
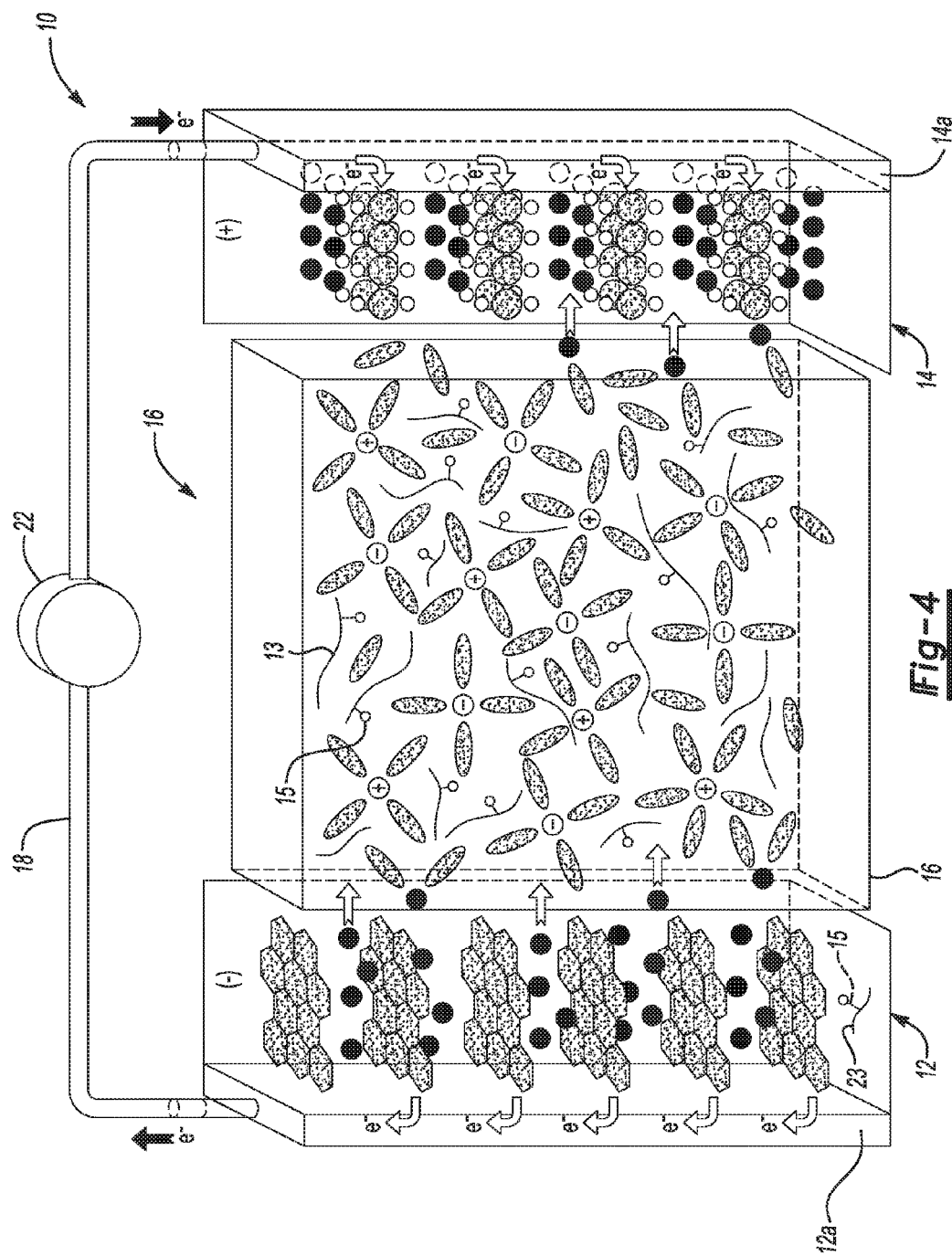
FIG. 4 is a schematic, perspective view of an example of a lithium ion battery during a discharging state, where the porous separator of the battery includes an example of the chelating agent disclosed herein.
Figure 5:
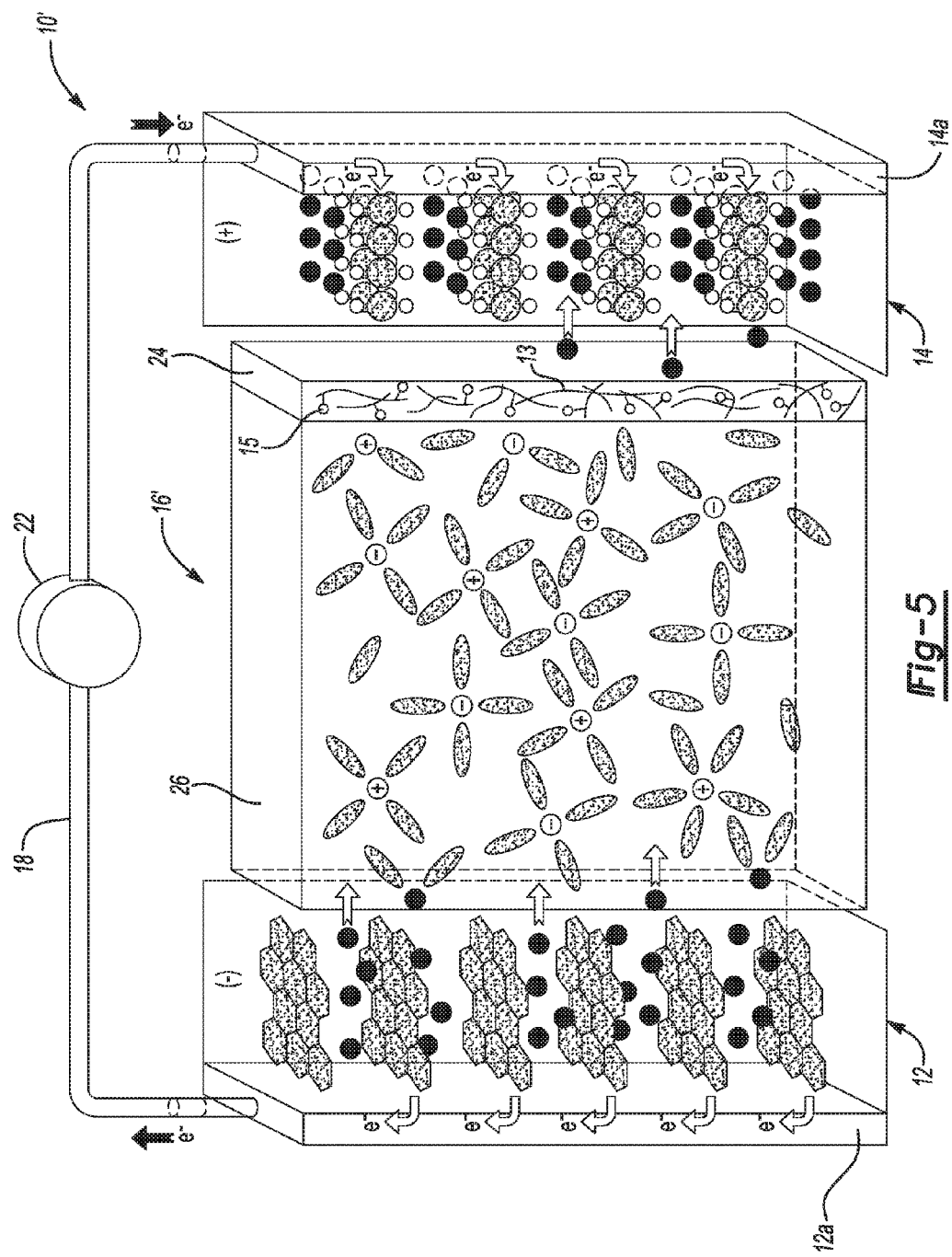
FIG. 5 is a schematic, perspective view of another example of a lithium ion battery during a discharging state, where the separator of the battery includes a porous membrane coated with a porous film of an example of the polymeric chelating agent disclosed herein.
Figure 6:
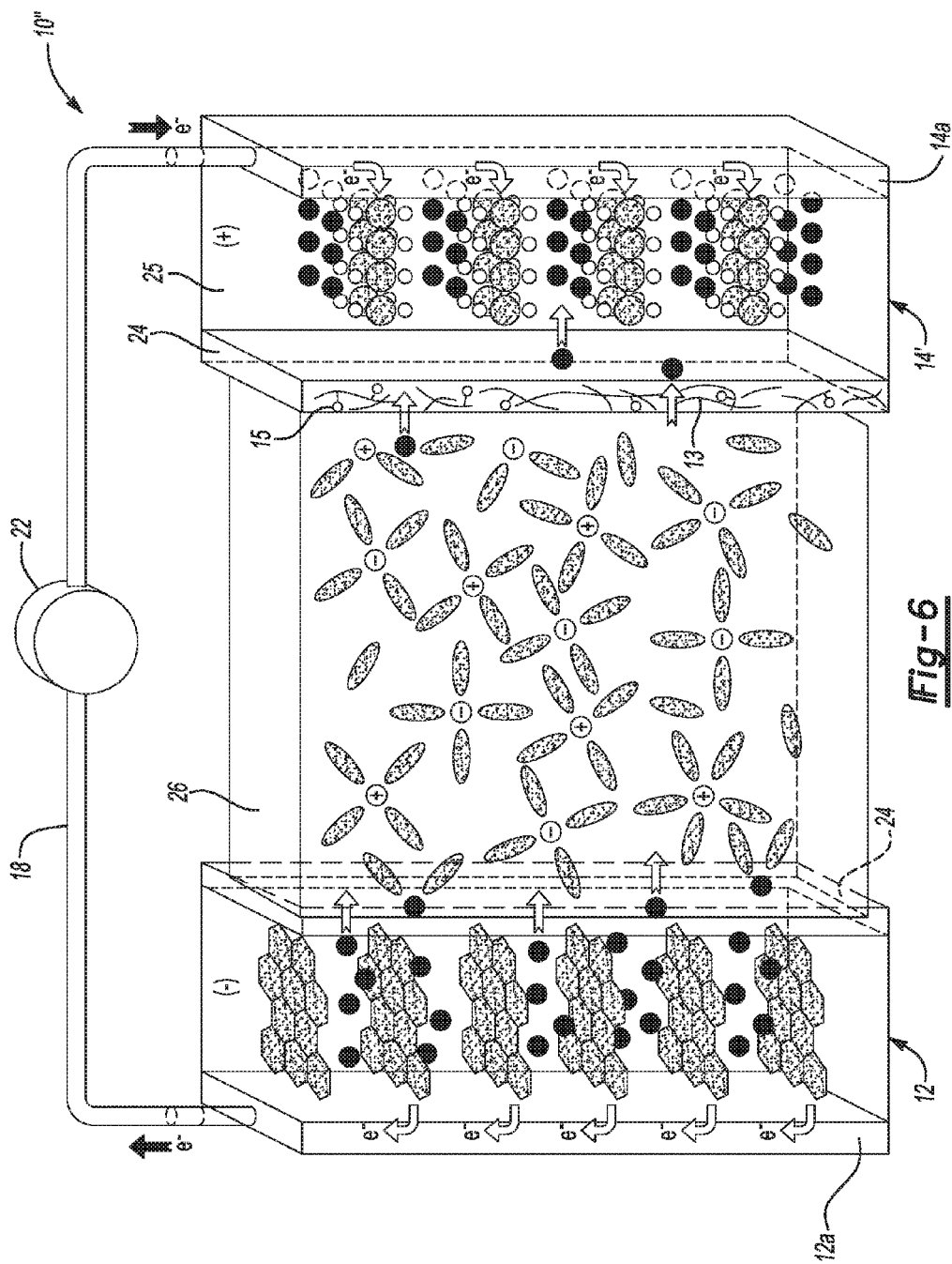
FIG. 6 is a schematic, perspective view of yet another example of a lithium ion battery during a discharging state, where an electrode(s) of the battery includes a structure coated with a porous film of an example of the polymeric chelating agent disclosed herein.

The separators shown in FIGS. 4 through 6 are depicted to illustrate the flow of ions between negative and positive electrodes of the respective lithium ion batteries, and thus are not necessarily drawn to scale.

DETAILED DESCRIPTION

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also operatively associated with, or supported by its respective current collector. The current collectors associated with the two electrodes are connected, e.g., via tabs, to an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in an aprotic non-aqueous solvent.

It has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning". In one example, a graphite electrode is poisoned by $Mn^{+2}$, $Mn^{+3}$ or $Mn^{+4}$ cations that dissolve from the spinel $Li_xMn_2O_4$ active material of the positive electrode. For instance, the $Mn^{+2}$ cations may migrate through the battery electrolyte, and deposit onto the graphite electrode. When deposited onto the graphite, the $Mn^{+2}$ cations may become Mn metal. It has been shown that a relatively small amount (e.g., 90 ppm) of Mn metal can poison the graphite electrode and prevent reversible electrode operation, thereby deleteriously affecting the useful life of the battery. The deleterious effect of the Mn deposited at the negative electrode is significantly enhanced during battery exposure to above-ambient temperatures (e.g., above 40° C.), irrespective of whether the exposure occurs through mere storage (i.e., simple stand at open circuit voltage in some state of charge) or during battery operation (i.e., during charging, during discharging, or during charging—discharging cycling).

The poisoning of the lithium ion battery by transition metals dissolving from the positive electrode may be reduced or prevented by incorporating an example(s) of the chelating agents disclosed herein into the battery. The chelating agent(s), alone or tethered to a polymeric or ceramic material, complex with and trap transition metal cations, such as Mn cations that leach from the positive electrode of the lithium ion battery, and thereby prevents their migration to the negative electrode and the associated battery performance degradation. Any transition metal cation may be trapped by examples of the chelating agent(s), including, for example, cations of manganese (e.g., $Mn^{+2}$, $Mn^{+3}$, $Mn^{+4}$), iron (e.g., $Fe^{2+}$, $Fe^{3+}$), chromium (e.g., $Cr^{2+}$, $Cr^{3+}$), cobalt (e.g., $Co^{2+}$, $Co^{3+}$), nickel (e.g., $Ni^{2+}$, $Ni^{3+}$, $Ni^{4+}$), and/or vanadium (e.g., $V^{3+}$, $V^{4+}$, $V^{5+}$).

Some previously identified transition metal cation chelating/trapping materials may be quite expensive in some instances. Examples of the present disclosure set forth new materials that are less expensive, while yet performing well to prevent transition metal cations from migrating to the negative electrode.

Further, the present inventors have discovered that there exists more than one type of Mn ion ($Mn^{2+}$, $Mn^{3+}$ and $Mn^{4+}$) in the electrolyte solution of a Li-ion cell, and that the chemical nature of the positive electrode may dictate the Mn speciation into $Mn^{2+}$, $Mn^{3+}$ and/or $Mn^{4+}$. Further, the trapping efficiency of various chelating agents varies with the ion type, and thus effective trapping agents for $Mn^{2+}$, $Mn^{+3}$, and $Mn^{4+}$ may be different from each other. Still further, other transition metal ions (e.g., $Ni^{2+}$, $Co^{2+}$, $Fe^{2+}$) may also be present and require trapping, to avoid performance loss.

Examples of the present disclosure set forth a selected/tailored mixture of transition metal ion chelating agents, e.g., designed for a particular combination of Mn cations in different oxidation states (and/or other combinations of transition metal cations) found in, for example, $LiPF_6$-based carbonate electrolyte solutions, to maximize the trapping of each type of ion found in the electrolyte solution of a given type of Li-ion battery.

The trapping efficiency of various chelating agents varies with the ion type, and thus suitable trapping agents for $Mn^{2+}$, $Mn^{+3}$, and $Mn^{4+}$, respectively, can be different from each other. Furthermore, other transition metal ions ($Ni^{2+}$, $Co^{2+}$, $Fe^{2+}$) may also be present and require trapping, to avoid performance loss.

In an example, the at least two selected/tailored (different) chelating agents have approximately the same relative concentration ratio to each other as the manganese cations in the two or more different oxidation states have to each other.

After Mn was leached from LMO and LNMO powders at 50° C. into 1M $LiPF_6$/EC:DMC, the present inventors found that about 70% of Mn ions leached from LMO are $Mn^{3+}$, about 40% to 50% of Mn ions leached from LNMO are $Mn^{3+}$, and about 90% of Mn ions leached from NMC 111 are $Mn^{3+}$. As such, without being bound to any theory, it is believed that the overall composition (LMO vs. LNMO vs. NMC) dictates the Mn cations speciation in the electrolyte solution.

By using a selected/tailored mixture of transition metal ion chelating agents, e.g., designed for a particular combination of Mn cation in at least two different oxidation states (and/or other combinations of transition metal cations) in the battery, there are many advantages. Some of these include: reduced/eliminated poisoning of negative electrodes by transition metal ions leached from the positive electrode; improved Li-ion battery durability (cycle and calendar life); improved overall power performance by enabling battery operation at above-ambient temperatures; improved power performance at sub-ambient temperatures (to −30° C.); and lower system cost through simplification or possible elimination of thermal management system.

Examples of the chelating agent disclosed herein may be any or a combination of: dissolved or dispersed in the electrolyte solution; grafted onto/tethered to a material of the nanoporous or microporous separator (e.g., as a substitute pendant group grafted onto a polymeric or ceramic material in/of the separator); attached to the binder material of the negative electrode; attached to the binder material of the positive electrode; disposed within pores of the separator; coated on a surface of the separator; coated on a surface of the negative electrode; and/or coated on a surface of the positive electrode.

Suitable chelating agents include metal ionophores, which, as used herein, are chemical compounds that bind to particular ions (e.g., $Mn^{+2}$ or other transition metal cations) while allowing the passage of lithium ions. Inside the battery, the chelating agent effectively traps the unwanted metal cations, while the movement of lithium ions across the nanoporous or microporous separator is not affected during operation of the battery. In an example, the chelating agent selectively complexes with the unwanted metal cations, for example, by immobilizing the metal cations (e.g., $Co^{+2}$, $Fe^{+2}$, $Mn^{+2}$, etc.) that may dissolve into the electrolyte solution from the positive electrode. The chelating agent thus operates as a metal cation scavenger that traps and immobilizes the unwanted metal cations to prevent the migration of the metal cations through the electrolyte solution and to the negative electrode. It is to be understood that the chelating agents complex less strongly with lithium ions (e.g., a single trapping site out of each one hundred sites are occupied by a $Li^+$ cation compared to a manganese cation), and thus does not adversely affect the movement of lithium ions between the negative and positive electrodes.

Figure 1:
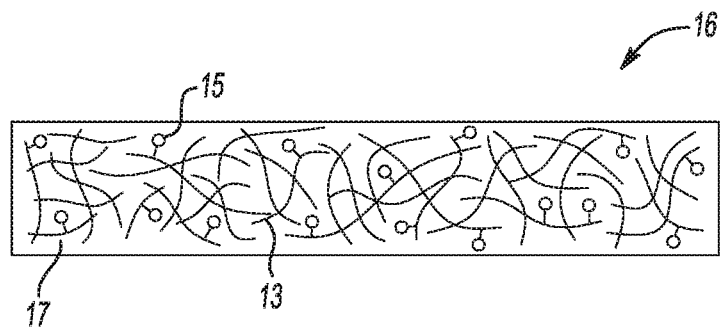
FIG. 1 is a schematic, cross-sectional view of an example of a porous separator formed with an example of a polymeric chelating agent disclosed herein.
Figure 2:
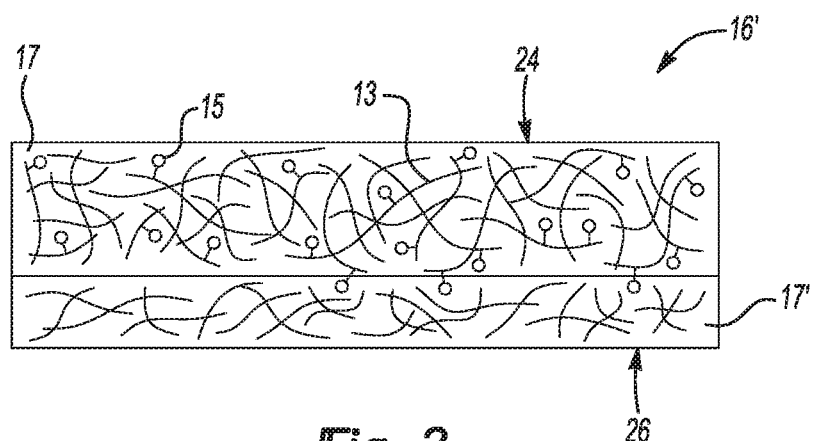
FIG. 2 is a schematic, cross-sectional view of an example of a porous separator including a porous membrane coated with a porous film of an example of a polymeric chelating agent disclosed herein.
Figure 3:
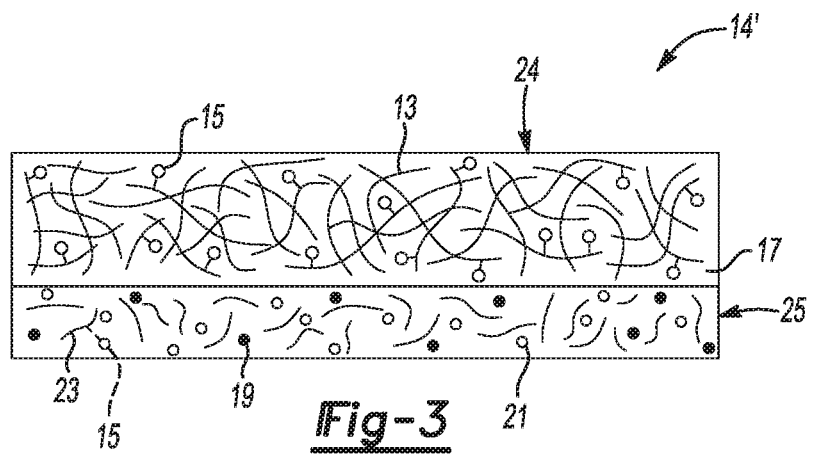
FIG. 3 is a schematic, cross-sectional view of an example of a positive electrode including a structure coated with a porous film of an example of a polymeric chelating agent disclosed herein.

FIGS. 1 through 3 illustrate different examples of a polymeric chelating agent disclosed herein.

In FIG. 1, a polymeric chelating agent forms the lithium ion battery separator 16. In this example, the separator 16 itself is a porous film of a polymeric chelating agent. In FIG. 1, the polymer backbone is represented by reference numeral 13, the chelating agent bonded thereto is represented by reference numeral 15, and the pores in the film are represented by reference numeral 17.

As illustrated in FIG. 1, this example of the separator 16 has pores 17 formed throughout the polymer backbone 13. The chelating agent 15 is attached to the polymer backbone 13. In this example, the bonded chelating agent 15 is part of the separator matrix and may be present inside of the open pores 17. In examples of the present disclosure, free (molecular) chelating agent 15 (i.e., not bound to a polymer) or polymeric chelating agents may also be used, e.g., as filler material within the separator matrix and/or operatively disposed within pores 17 of separator 16 (e.g., as beads (separate from the separator matrix) inside the pores 17 of the separator 16).

In another example, free (molecular) chelating agent 15 may also be dissolved or dispersed in the electrolyte solution.

In an example, the chelating agent 15 that is attached to the polymer backbone 13 may be a crown ether, an aza-crown ether, a cryptand, a crown ether having at least one ether oxygen substituted with a heteroatom, a lariat ether, a calixarene, a calixcrown, or combinations thereof. A generalized description of some of these chelating agents is provided further below.

Referring now to FIG. 2, the polymeric chelating agent is in the form of a coating 24 on a nanoporous or microporous membrane 26. Together, the coating 24 and the nanoporous or microporous membrane 26 form another example of the lithium ion battery separator 16'. Since the coating 24 is formed on the surface of a nanoporous or microporous membrane 26, some of the polymeric chelating agent may, in some instances, migrate into the pores 17' of the nanoporous or microporous membrane 26.

The polymeric chelating agent may be formed as described in reference to FIG. 1, and includes the chelating agent 15 attached to the polymer backbone 13. The resulting coating 24 also includes the pores 17. In an example of coating the membrane 26 with the polymeric chelating agent, the polymeric chelating agent may be suspended in tetrahydrofuran, and this suspension may be deposited on or otherwise exposed to the membrane 26. For example, a wet film of the suspension may be applied to the membrane 26.

Examples of suitable nanoporous or microporous membranes 26 include a polyolefin. As examples, the polyolefin may be polyethylene (PE), polypropylene (PP), a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

In another example, the nanoporous or microporous membrane 26 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polyvinylidene fluoride copolymers (e.g., PVdF—hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, mesoporous silica, and/or combinations thereof. It is believed that another example of a liquid crystalline polymer that may be used for the membrane 26 is poly(p-hydroxybenzoic acid). In yet another example, the membrane 26 may be a combination of one of these polymers and a polyolefin (such as PE and/or PP). Some other commercially available separators are available from Entek International, Asahi-Kasei Corporation, Toray Industries, and SK Energy.

The nanoporous or microporous membrane 26 may contain a single layer or a multi-layer laminate fabricated from either a dry or wet process, by solvent casting, by a nonwoven fiber laying process, or by any other process for making a nanoporous or microporous membrane 26 with properties suitable for application in Li-ion batteries. For example, in one example, a single layer of the polyolefin may constitute the entirety of the membrane 26. In another example, a single layer of one or a combination of any of the polymers from which the membrane 26 may be formed (e.g., the polyolefin and/or one or more of the other polymers listed above for the membrane 26) may constitute the entirety of the membrane 26. As another example, however, multiple discrete layers of similar or dissimilar polyolefins and/or polymers for the membrane 26 may be assembled into the membrane 26. In one example, a discrete layer of one or more of the polymers may be coated on a discrete layer of the polyolefin for the membrane 26. Further, the polyolefin (and/or other polymer) layer, and any other optional polymer layers, may further be included in the membrane 26 as a fibrous layer to help provide the membrane 26 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Still other suitable nanoporous or microporous membranes 26 include those that have a ceramic layer attached thereto, those that have ceramic filler in the polymer matrix (i.e., an organic-inorganic composite matrix), and those that are formed from a ceramic material. Some examples of suitable ceramic materials include alumina ($Al_2O_3$) and silica ($SiO_2$.)

Referring now to FIG. 3, the polymeric chelating agent is in the form of a coating 24 on a structure 25. Together, the coating 24 and the structure 25 form an example of a positive electrode 14'. Coating 24 may also or alternatively be on the negative electrode 12, e.g., as shown in phantom in FIG. 6. While not shown in FIG. 6, it is to be understood that the entire negative electrode 12 may be encapsulated in the coating 24.

As mentioned above, the polymeric chelating agent includes the chelating agent 15 attached to the polymer backbone 13. The resulting coating 24 also includes the pores 17. In an example of coating the structure 25 with the polymeric chelating agent, the polymeric chelating agent may be suspended in tetrahydrofuran, and this suspension may be deposited on or otherwise exposed to at least the surface of the structure 25 to be positioned adjacent to a nanoporous or microporous membrane 26 (not shown in FIG. 3) in a lithium ion battery. While not shown in FIG. 3, it is to be understood that the entire structure 25 may be encapsulated in the coating 24.

The structure 25 includes a lithium transition metal based active material 19, a conductive carbon 21, and a binder 23. It is to be understood that any lithium transition metal based active material 19 that can sufficiently undergo lithium intercalation and deintercalation while functioning as the positive terminal of a lithium ion battery may be used. Examples of the active material 19 include at least one of spinel lithium manganese oxide ($LiMn_2O_4$, a.k.a. LMO), lithium cobalt oxide ($LiCoO_2$, a.k.a. LCO), a manganese-nickel-oxide spinel [$Li(Mn_{1.5}Ni_{0.5})O_2$] (a.k.a. LNMO), a layered lithium nickel-manganese-cobalt oxide [$Li(Ni_{1-x}Mn_{1-y}Co_{x+y})O_2$] (a.k.a. NMC), $LiNiO_2$, $Li_2MSiO_4$ (M=Co, Fe, Mn), a lithium iron polyanion oxide, such as lithium iron phosphate ($LiFePO_4$) or lithium iron fluorophosphate ($Li_2FePO_4F$), or a lithium rich layer-structure cathode, such as $xLi_2MnO_3$-$(1-x)LiMO_2$ (M is composed of any ratio of Ni, Mn and Co). Other lithium-based active materials may also be utilized, such as $LiNi_{1-x}Co_{1-y}M_{x+y}O_2$, $LiMn_{1.5-x}Ni_{0.5-y}M_{x+y}O_4$ (M is composed of any ratio of Al, Cr, Ti, and/or Mg), stabilized lithium manganese oxide spinel ($Li_xMn_{2-y}M_yO_4$, with M is composed of any ratio of Al, Cr, Ti, and/or Mg), lithium vanadium oxide ($LiV_2O_5$), $Li_2MSiO_4$ (M is composed of any ratio of Co, Fe, and/or Mn), $xLi_2MnO_3$-$(1-x)LiMO_2$ (M is composed of any ratio of Ni, Mn and/or Co), and any other nickel-manganese-cobalt material. By "any ratio" it is meant that any element may be present in any amount. So, in some examples, M could be Ni, with or without Co and/or Mn, or any other combination of the listed elements. In another example, anion substitutions may be made in the lattice of any example of the lithium transition metal based active material to stabilize the crystal structure. For example, any O atom may be substituted with an F atom.

The conductive carbon 21 of the structure 25 may be any high surface area carbon, such as acetylene black, that intermingles with the lithium transition metal based active material 19. "High surface area carbon" as used herein is meant to include any carbon having a BET (=Brunauer-Emmett-Teller) surface area ranging from 50 to 2,000 $m^2/g$. The conductive carbon 21 may be added to ensure electron conduction between a current collector of the lithium ion battery and the active material particles 19 of the positive electrode 14'. The conductive carbon 21 may also be carbon nanotubes, both single-walled (SW) and multi-walled (MW), present in amounts ranging from about 0.02 wt % to about 1 wt %.

In an example, as shown in phantom in FIG. 3, the chelating agent 15 may be attached to the binder 23 of the positive electrode 14'. It is to be understood that the chelating agent 15 may also or alternatively be attached to the binder 23 of the negative electrode 12 (as shown in phantom in FIG. 4).

The binder 23 of the structure 25 (or of the negative electrode 12) may be any polymeric binder that is capable of structurally holding the lithium-based active material 19 together. Some examples of the binder 23 include polyvinylidene fluoride (PVdF), ethylene propylene diene monomer (EPDM) rubber, carboxymethyl cellulose (CMC), lithium polyacrylate (LiPAA), sodium polyacrylate (Na-PAA), sodium alginate, and/or lithium alginate. In an example, LiPAA and Na/Li alginate may be desirable for use in high-voltage (5 V) positive electrode materials.

FIGS. 4 through 6 illustrate different examples of the lithium ion battery 10, 10', 10" incorporating different examples of the polymeric chelating agent disclosed herein. The batteries 10, 10', 10" generally include a negative electrode 12, a negative-side current collector 12a, a positive electrode 14, a positive-side current collector 14a, and a separator 16, 16', or 26 positioned between the negative electrode 12 and the positive electrode 14. It is to be understood that the separator 16, 16', 26 and/or the positive electrode 14 and/or the negative electrode 12 may include the chelating agent 15 and polymer backbone 13 coated thereon. Each example of the lithium ion battery 10, 10', 10" also includes an interruptible external circuit 18 that connects the negative electrode 12 and the positive electrode 14.

Referring now to FIG. 4, the lithium ion battery 10 includes the separator 16 shown in FIG. 1 disposed between a negative electrode 12 and a positive electrode 14. As discussed above, the separator 16 is formed of an example of the polymeric chelating agent. The separator 16, which operates as an electrolyte solution-containing sponge and an electrical insulator, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the black dots and by the open circles having a (+) charge in FIG. 4) and related anions (identified by the open circles having a (−) charge in FIG. 4) through an electrolyte solution filling its pores. The chelating agent 15 present in the matrix of the separator 16 also effectively traps and immobilizes the unwanted metal cations (e.g., $Mn^{2+}$) to prevent the migration of these metal cations through the electrolyte solution and to the negative electrode 12. In another example, the chelating agent 15 (not tethered to a polymer) may be dissolved or dispersed in the electrolyte solution. Some examples of chelating agents in molecular form (one example of which is tetrasodium salt of ethylenediamine tetraacetic acid (EDTANa$_4$)) are listed further below.

The negative electrode 12 may include any lithium host active material that can sufficiently undergo lithium intercalation and deintercalation while functioning as the negative terminal of the lithium ion battery 10. Examples of the lithium host active material include graphite or a low surface area amorphous carbon. Graphite is widely utilized to form the negative electrode 12 because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate (LTO), silicon or silicon-carbon composites, and tin oxide.

The negative electrode 12 may also include a polymer binder material 23 intermingled with the lithium host active material to structurally hold the lithium host active material together. Some examples of the binder include polyvinylidene fluoride (PVdF), ethylene propylene diene monomer (EPDM) rubber, carboxymethyl cellulose (CMC), sodium alginate, or lithium alginate. These materials (i.e., the lithium host active material and the binder) may be mixed with a high surface area carbon, such as acetylene black, to ensure electron conduction between the current collector (shown as 12a in FIG. 4) and the active material particles of the negative electrode 12. The negative-side current collector 12a may be formed from copper or any other appropriate electrically conductive material known to skilled artisans.

The positive electrode 14 in this example of the lithium ion battery 10 is similar to structure 25 previously described in reference to FIG. 3. In short, the positive electrode 14 may include any of the lithium transition metal based active materials 19, conductive carbons 21, and binders 23 previously described.

Adjacent to the positive electrode 14 is the positive-side current collector 14a, which may be formed from aluminum or any other appropriate electrically conductive material known to skilled artisans.

The negative-side current collector 12a and the positive-side current collector 14a may be positioned in contact with the negative electrode 12 and the positive electrode 14, respectively, to collect and move free electrons to and from an interruptible external circuit 18, which connects the negative electrode 12 and the positive electrode 14.

In an example, each of the negative electrode 12, the positive electrode 14, and the porous separator 16 are soaked in an electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution include LiClO$_4$, LiAlCl$_4$, LiI, LiBr, LiSCN, LiBF$_4$, LiB(C$_6$H$_5$)$_4$, LiCF$_3$SO$_3$, LiN(CF$_3$SO$_2$)$_2$ (LiTFSI), LiN(FSO$_2$)$_2$(LiFSI), LiAsF$_6$, LiPF$_6$, LiB(C$_2$O$_4$)$_2$ (LiBOB), LiBF$_2$(C$_2$O$_4$) (LiODFB), LiPF$_4$(C$_2$O$_4$) (LiFOP), LiNO$_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate) (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, tiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Other electrolytes may be used instead of the electrolyte solution. As examples, polymer electrolytes, ionic liquids, melt electrolytes, or the like may be used. Some specific examples of ionic liquids include 1-ethyl-3-methylimidazolium bis(fluorosulfonyl)imide, 1-ethyl-3-methylimidazolium bis(trifluoromethane sulfonyl)imide, phosphonium bis (trifluoromethane sulfonyl) imide, phosphonium bis (fluorosulfonyl) imide, triethyl(methoxymethyl) phosphonium bis(trifluoromethylsulfonyl)imide, triethyl(2-methoxyethyl)phosphonium, and bis (trifluoromethylsulfonyl)imide. Some examples of melt electrolytes include lithium bis(fluorosulfonyl)imide in dimethylmethanesulfonamide and lithium bis(trifluoromethane sulfonyl)imide in dimethylmethanesulfonamide. While some examples have been given herein, it is to be understood that other polymer electrolytes, ionic liquids, and eutectic melt electrolytes could be used.

The lithium ion battery 10 may support a load device 22 that can be operatively connected to the external circuit 18. The load device 22 receives a feed of electrical energy from the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be an electrical power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 may also include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10, or a plurality of lithium ion batteries, may also be connected in series and/or in parallel with other similar lithium ion batteries to produce a greater voltage output and current (if arranged in parallel) or voltage (if arranged in series) if the load device 22 so requires.

The lithium ion battery 10 generally operates by reversibly passing lithium ions between the negative electrode 12 and the positive electrode 14. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of intercalated lithium while the positive electrode 14 is relatively depleted. When the negative electrode 12 contains a sufficiently higher relative quantity of intercalated lithium, the lithium ion battery 10 can generate a beneficial electric current by way of reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 14 and the negative electrode 12 (ranging from about 2.0V to about 5.0V, depending on the exact chemical make-up of the electrodes 14, 12) drives the electrons ($e^-$) produced by the oxidation of intercalated lithium at the negative electrode 12 through the external circuit 18 towards the positive electrode 14. The lithium ions, which are also produced at the negative electrode 12, are concurrently carried by the electrolyte solution through the porous separator 16 towards the positive electrode 14. The electrons ($e^-$) flowing through the external circuit 18 and the lithium ions migrating across the separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external power source to the lithium ion battery 10 compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery 10 may vary depending on the size, construction, and particular end-use of the lithium ion battery 10. Some suitable external battery chargers include a battery charger plugged into an AC wall outlet and a motor vehicle alternator.

Referring now to FIG. 5, another example of the lithium ion battery 10' is depicted. This example includes the separator 16' shown in FIG. 2 disposed between a negative electrode 12 and a positive electrode 14. As discussed above, the coating 24 on the membrane 26 of the separator 16' is formed of an example of the polymeric chelating agent.

In this example, the separator 16' operates as both an electrical insulator and a mechanical support, and is sandwiched between the negative electrode 12 and the positive electrode 14 to prevent physical contact between the two electrodes 12, 14 and the occurrence of a short circuit. The separator 16 ensures passage of lithium ions (identified by the black dots and by the open circles having a (+) charge in FIG. 5) and related anions (identified by the open circles having a (−) charge in FIG. 5) through an electrolyte solution filling its pores. The chelating agent 15 present in the coating 24 of the separator 16' also effectively traps and immobilizes the unwanted metal cations (e.g., $Mn^{2+}$) to prevent the migration of these metal cations through the electrolyte solution and to the negative electrode 12.

The other components (e.g., the electrodes 12, 14, current collectors 12a, 14a, external circuit 18, load 22, etc.) and the operation of the battery 10' are similar to the components previously described herein in reference to the battery 10 and the operation of the battery 10.

Referring now to FIG. 6, still another example of the lithium ion battery 10" is depicted. This example includes the positive electrode 14' shown in FIG. 3 disposed so that the coating 24 is adjacent to one side of the porous membrane 26 (which, in this example, functions as a separator). As discussed above, the coating 24 on the structure 25 of the positive electrode 14' is formed of an example of the polymeric chelating agent. Also as mentioned above, coating 24 may also or alternatively be on the negative electrode 12, e.g., as shown in phantom in FIG. 6.

In this example, the membrane 26 operates as both an electrical insulator and a mechanical support, and is sandwiched between the negative electrode 12 and the positive electrode 14' to prevent physical contact between the two electrodes 12, 14' and the occurrence of a short circuit. The membrane 26 ensures passage of lithium ions (identified by the black dots and by the open circles having a (+) charge in FIG. 6) and related anions (identified by the open circles having a (−) charge in FIG. 6) through an electrolyte solution filling its pores. Any examples of the membrane 26 previously described may be used in this example of the battery 10''.

As mentioned above, the coating 24 of the positive electrode 14' is positioned adjacent to the membrane 26. In this example, the chelating agent 15 present in the coating 24 of the positive electrode 14' effectively traps and immobilizes the unwanted metal cations (e.g., $Mn^{2+}$) to prevent the migration of these metal cations through the membrane 26 (and the electrolyte solution) and to the negative electrode 12.

The other components (e.g., the electrode 12, current collectors 12a, 14a, external circuit 18, load 22, etc.) and the operation of the battery 10'' are similar to the components previously described herein in reference to the battery 10 and the operation of the battery 10.

As mentioned above, examples of the present disclosure set forth a selected/tailored mixture (e.g., two or more) of transition metal ion chelating agents, e.g., designed for a combination of Mn cations in at least two different oxidation states (and/or other combinations of transition metal cations/cations in different oxidation states) found in, for example, $LiPF_6$-based carbonate electrolyte solutions, to maximize the trapping of each type of ion found in the electrolyte solution of a given type of Li-ion battery (to prevent/reduce the migration of these metal cations to the negative electrode 12).

Chelating agents according to the present disclosure are selected from at least two different chelating agents configured/tailored to complex with: i) two or more different transition metal ions; ii) cations in at least two or more different oxidation states of a same transition metal ion; or iii) both i) and ii).

Examples of chelating agents from which the at least two different chelating agents may be selected include:

1) ion traps in molecular form selected from the group consisting of: polyamines, thiols, alkali metal salts of organic acids (examples of organic acids include, e.g., phenols, alcohols, thiols, carboxylic acids, and sulfonic acids), and combinations thereof;

2) polymers functionalized with alkali metal salts of organic acids;

3) polymers functionalized with nitrogen functional groups;

4) polymers with multiple functional groups (some examples of which include bactins, chitosan, lignin, etc.). Some examples of functional groups include carboxylic acid salts, macrocycles, amines, hydroxyl groups, etc. Categories 2)-4) are examples of polymeric chelating agents described herein; and 5) polymers functionalized with cyclic structures, the cyclic structures being selected from the group consisting of crown ethers, azacrown ethers, thiacrown ethers, cryptands, lariat ethers, calixarenes, calixcrowns.

It is to be understood that the at least two different chelating agents may be selected from the same category (1-5) or from two or more different categories (1-5).

Some non-limiting examples of each of the categories are described below. It is to be understood that any of lithium, sodium, potassium and/or cesium salts of any examples of categories (1-5) may be used in examples of the chelating agents of the present disclosure. Further, many, but not all of the chemical structures are shown for the examples below.

1. Ion Traps in Molecular Form 1.1 Alkali Metal (e.g., any or a Mixture of Li, Na, K, and Cs) Salts of Organic Acids 1.1.1. Bidentate ("-dentate" as used herein is meant to signify the number of acidic groups available to complex with unwanted transition metal ions; e.g., "bidentate" includes two such acidic groups, "tridentate" includes three, etc. Multi-dentate is meant to include bidentate, tridentate . . . etc.)

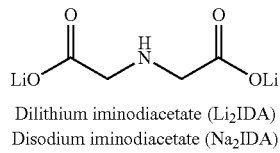

Dilithium iminodiacetate ($Li_2IDA$)
Disodium iminodiacetate ($Na_2IDA$)

1.1.2. Tridentate

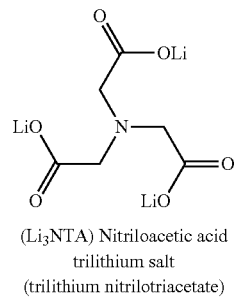

($Li_3NTA$) Nitriloacetic acid trilithium salt
(trilithium nitrilotriacetate)

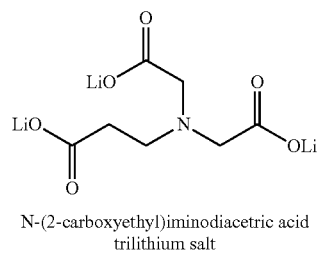

N-(2-carboxyethyl)iminodiacetric acid trilithium salt $Na_3NTA$ is another example

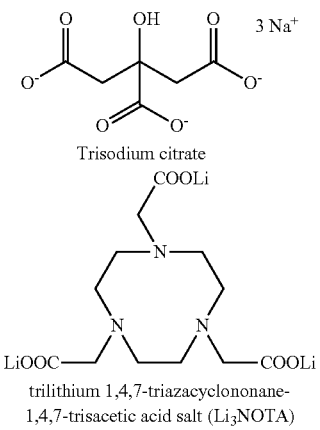

Trisodium citrate trilithium 1,4,7-triazacyclononane-1,4,7-trisacetic acid salt ($Li_3NOTA$)

1.1.3. Tetradendate

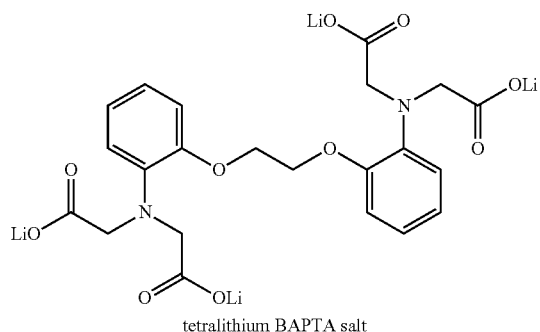

tetralithium BAPTA salt

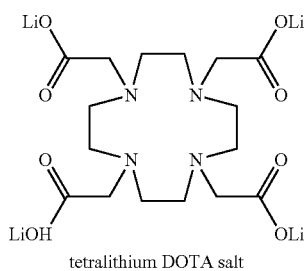

tetralithium DOTA salt

The IUPAC name of Li$_4$BAPTA salt is tetralithium salt of 1,2-bis(o-amino phenoxy)ethane-N,N,N',N'-tetra acetic acid The IUPAC name of Li$_4$DOTA salt is tetralithium salt of 1,4,7,10-tetra aza cyclo dodecane-1,4,7,10-tetra acetic acid

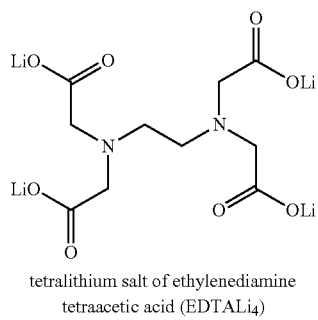

tetralithium salt of ethylenediamine tetraacetic acid (EDTALi$_4$)

Another tetradentate example is tetrasodium salt of ethylenediamine tetraacetic acid (EDTANa$_4$).

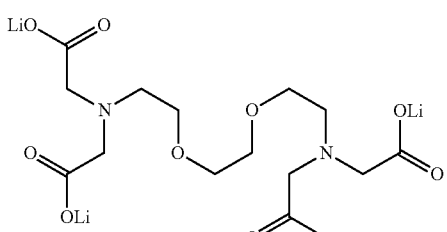

Li$_4$EGTA (ethyleneglycol-bis-(2-aminoethyl ether)-N, N, N', N'-tetra acetic acid tetralithium salt)

1.1.4. Pentadendate

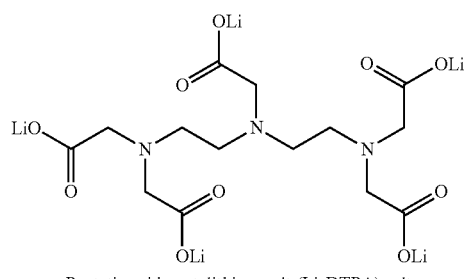

Pentetic acid pentalithium salt (Li$_5$DTPA) salt

1.1.5. Hexadendate

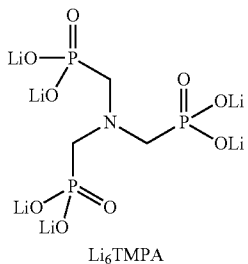

Li$_6$TMPA

The IUPAC Name of Li$_6$TMPA is tris(methylene phosphonic acid) hexalithium salt

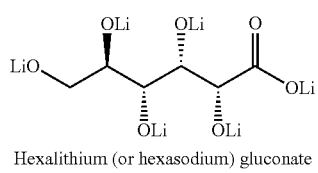

Hexalithium (or hexasodium) gluconate

1.1.6. Octadentate

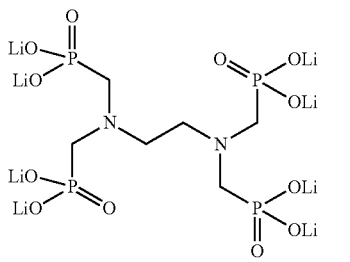

Octalithium ethylene diamine tetramethyl phosphate (Li$_8$EDTMP)

1.2 Polyamines

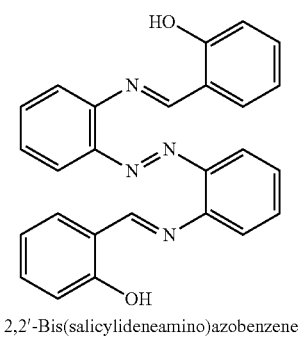 [SMILES: Oc1ccccc1/C=N/c1ccccc1/N=N/c1ccccc1/N=C/c1ccccc1O]

2,2'-Bis(salicylideneamino)azobenzene

1.3 Thiols

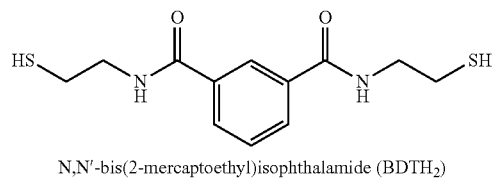 [SMILES: O=C(NCCS)c1cccc(C(=O)NCCS)c1]

N,N'-bis(2-mercaptoethyl)isophthalamide (BDTH₂)

2. Polymers Functionalized with Alkali Metal (Li, Na, K, and/or Cs) Salts of Organic Acids

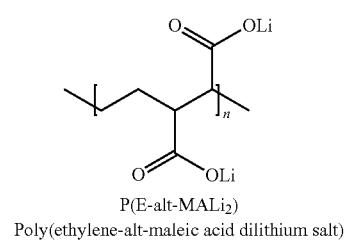

P(E-alt-MALi₂)
Poly(ethylene-alt-maleic acid dilithium salt)

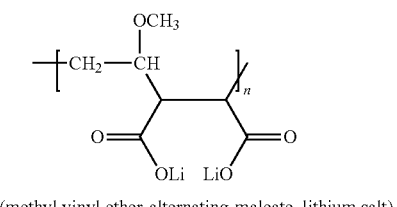

Poly(methyl vinyl ether-alternating-maleate, lithium salt)

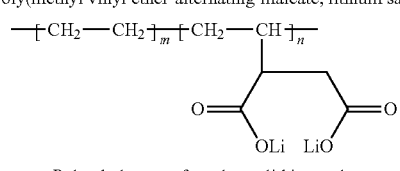

Polyethylene-graft-maleate, lithium salt

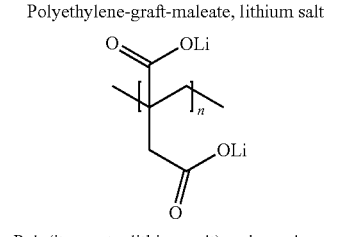

Poly(itaconate, lithium salt) and copolymers

-continued

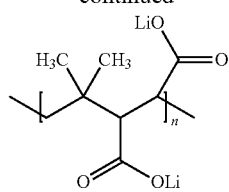

Poly(isobutylene-alternating-maleate, lithium salt)

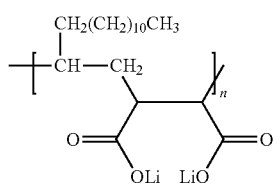

Poly(1-tetradecene-alternating-maleate, lithium salt)

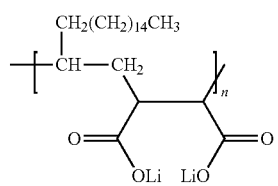

Poly(1-octadecene-alternating-maleate, lithium salt)

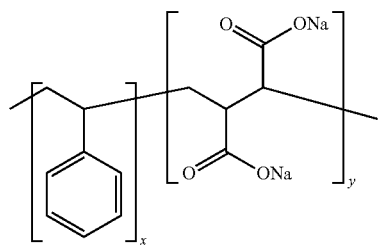

Poly(styrene-maleate disodium salt) copolymer

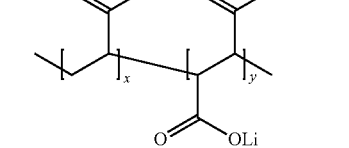

Poly(acrylate, lithium salt-co-maleate, lithium salt)

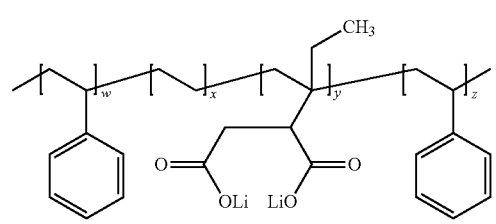

Polystyrene-block-poly(ethylene-random-butylene)-block-polystyrene-graft-maleate, lithium salt

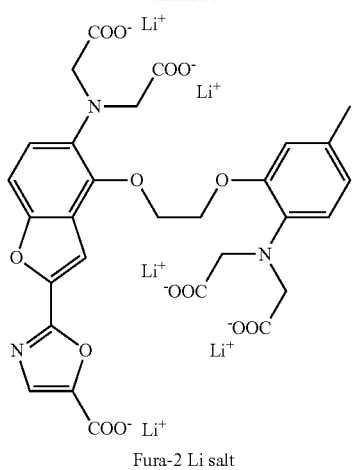

Fura-2 Li salt

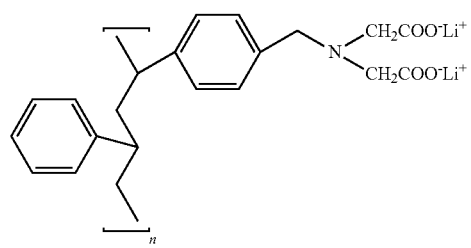

(IDALi$_2$) styrene-divinylbenzene copolymer functionalized with dilithium salt of iminodiacetic acid (IDANa$_2$) styrene-divinylbenzene copolymer functionalized with disodium salt of iminodiacetic acid 3. Polymers Functionalized with Nitrogen Functionalities (Amines and Pyridine)

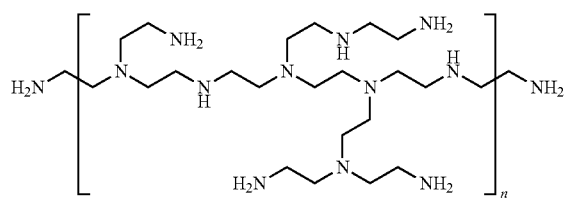

Linear and branched polyethyleneimine (PEA) (shown), as well as carboxymethylated and carboxyethylated polyethyleneimine

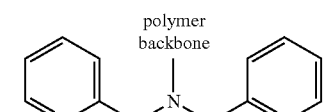

BPAP (bis-picolylamine funtionalized polymer)

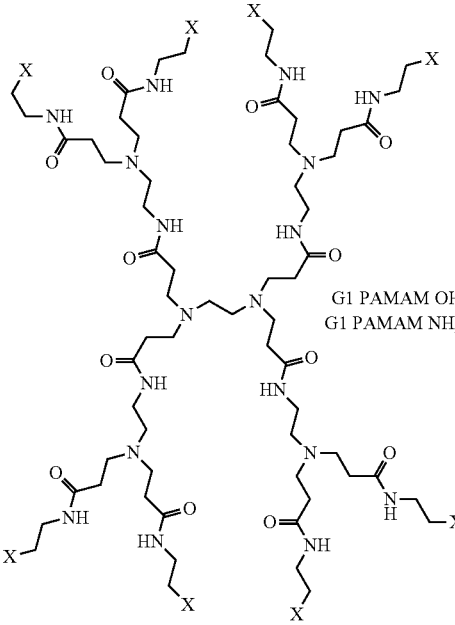

G1 PAMAM OH: X = OH
G1 PAMAM NH$_2$: X = NH$_2$

Poly(amidoamine) (PAMAM) dendrimer

4 Polymer with Multiple Functional Groups

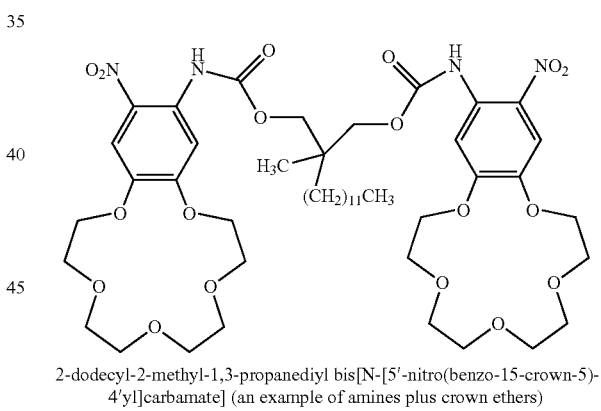

2-dodecyl-2-methyl-1,3-propanediyl bis[N-[5'-nitro(benzo-15-crown-5)-4'yl]carbamate] (an example of amines plus crown ethers)

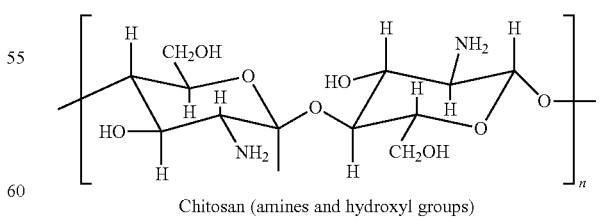

Chitosan (amines and hydroxyl groups)

Carboxymethylated chitosan and carboxyethylated chitosan are also suitable examples of polymers with multiple functional groups.

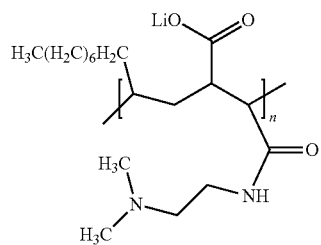
Poly(maleate, lithium salt-alternating-1-decene), 3-(dimethylamino)-1-propylamine derivative
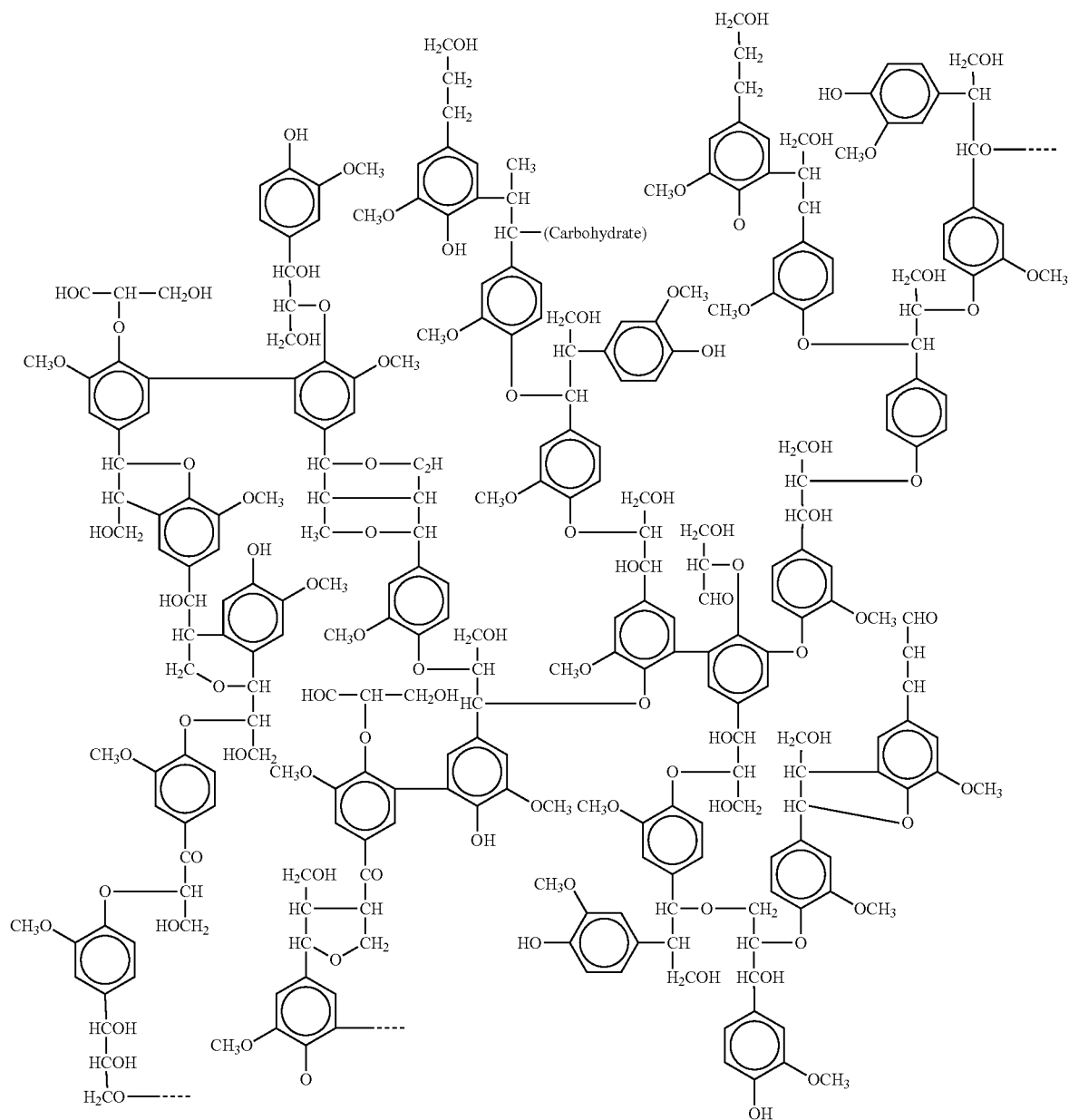
Lignin Carboxymethylated lignin and carboxyethylated lignin are also suitable examples of polymers with multiple functional groups.

Bactins:

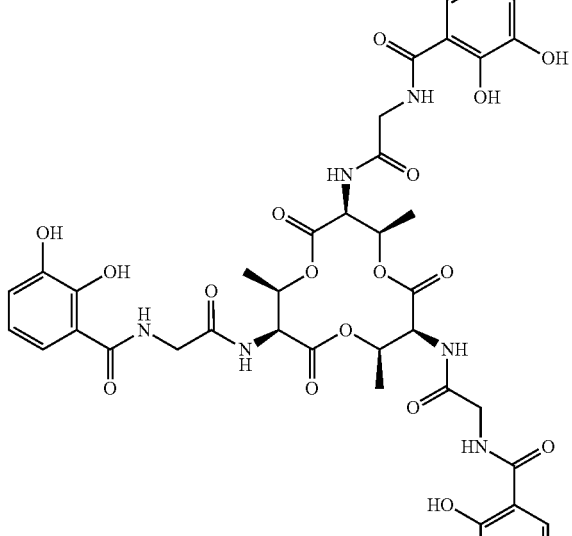

Bacillibactin

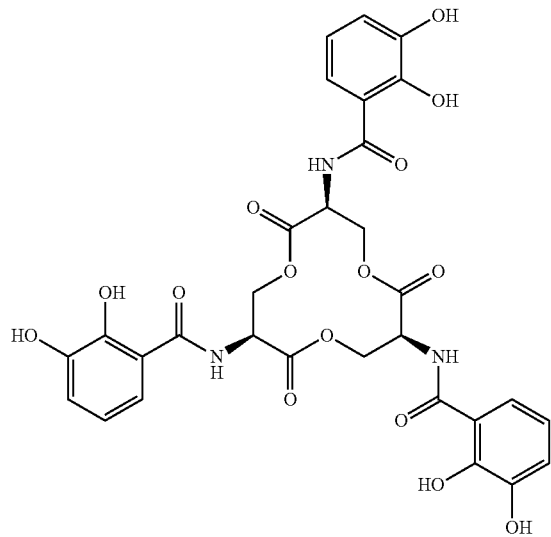

Enterobactin

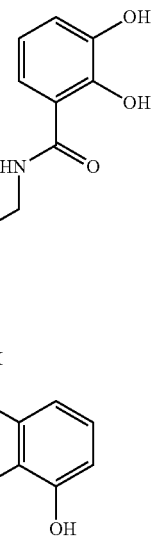

H$_6$-Mecam

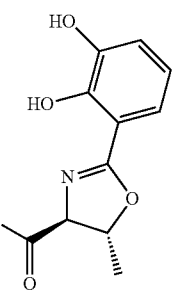

Vibriobactin

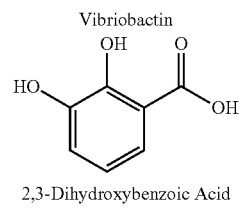

2,3-Dihydroxybenzoic Acid

5. Polymers Functionalized with Cyclic Structures

A polymer, copolymer, terpolymer, etc. of choice may be functionalized with a desired cyclic structure chelating agent. The desired chelating agent may be a crown ether, aza-crown ethers, cryptands, a crown ether having at least one ether oxygen substituted with a heteroatom, a lariat ether, a calixarene, a calixcrown, or combinations thereof (some examples of which will be described below).

A crown ether is a cyclic ether in which the ether ring includes oxygen atoms that can complex with a transition metal cation. In many examples, the cyclic ether is a macrocycle. Some or all of the oxygen atoms in the ether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a transition metal cation, or polycyclic, in which the crown ether forms a more three-dimensional cage for complexing with a metal cation. One example of a polycyclic crown ether is a cryptand (such as, e.g., cryptand [2.2.2], cryptand [2.2.1], and cryptand [2.1.1]; the "[$N_1.N_2.N_3$]" notation is a short-hand proposed by Jean-Marie Lehn). One or more oxygen atoms in the cryptand or other crown ether may also be substituted at any location along its polyether ring by any of a variety of atoms or functional groups known to those skilled in the art. For example, the cryptand may include sulfur substituted at one or more oxygen sites, or may include nitrogen substituted at one or more oxygen sites.

It is believed that crown ethers having structures where i) the size of the cavity defined by the crown structure has a diameter that is close to the size of the ion (e.g., the transition metal cation) to be trapped, and ii) a permanent dipole moment possesses a maximum charge for any given separation between positive and negative charges of the structure, are more desirable for use in the examples of the lithium battery disclosed herein. For instance, a chelating agent possessing a permanent dipole moment (such as crown ethers having an odd number of oxygen atoms in its polyether ring (e.g., 9-crown-3, 15-crown-5, etc.), and further have thia- (i.e., sulfur) or aza- (i.e., nitrogen) substitutions that tend to break the symmetry of the charge distribution of a symmetric crown ether (such as 12-crown-4 or 18-crown-6) or an increase in the charge separation in an asymmetric chelating agent) will align counter-parallel to an externally applied electric field to minimize its potential energy in the applied field. This will, in effect, maximize the ion trapping ability of the crown ether.

A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calix-crown is a calixarene that includes a polyether ring that links two phenolic oxygens of the calixarene framework. The indifference these chelating agents show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the chelating agents just mentioned may also be employed.

A list of some chelating agents 15 that may be used in the polymeric chelating agent disclosed herein include:

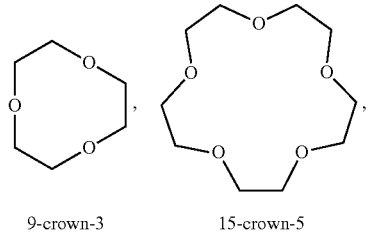

9-crown-3, 15-crown-5

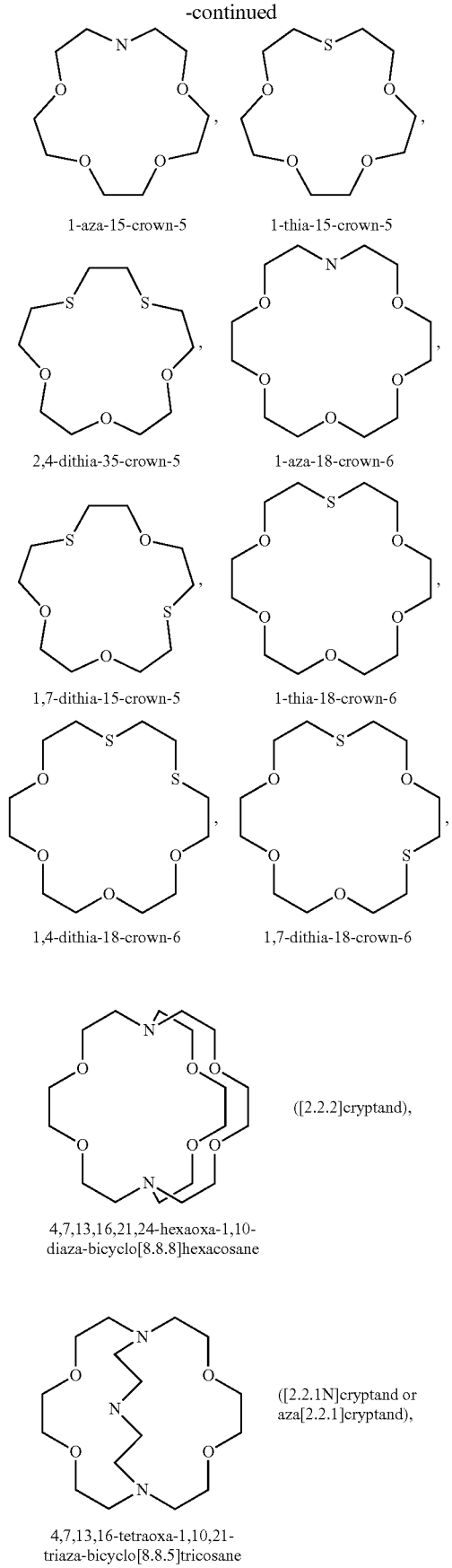

1-aza-15-crown-5, 1-thia-15-crown-5

2,4-dithia-35-crown-5, 1-aza-18-crown-6

1,7-dithia-15-crown-5, 1-thia-18-crown-6

1,4-dithia-18-crown-6, 1,7-dithia-18-crown-6

4,7,13,16,21,24-hexaoxa-1,10-diaza-bicyclo[8.8.8]hexacosane ([2.2.2]cryptand), 4,7,13,16-tetraoxa-1,10,21-triaza-bicyclo[8.8.5]tricosane ([2.2.1N]cryptand or aza[2.2.1]cryptand),

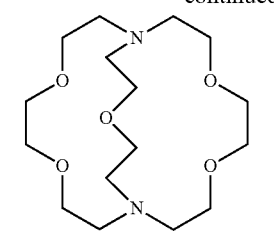

([2.2.1]cryptand), 4,7,13,16,21-pentaoxa-1,10,-diaza-bicyclo[8.8.5]tricosane

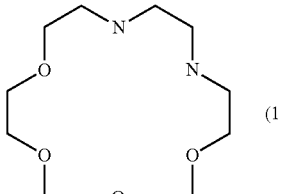

(1,4-diaza-18-crown-6),

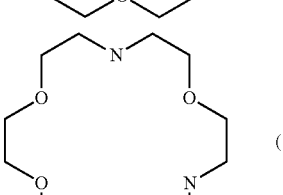

(1,7-diaza-18-crown-6),

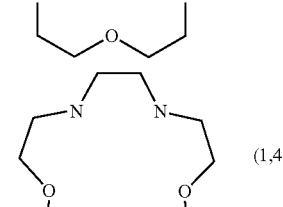

(1,4-diaza-15-crown-5),

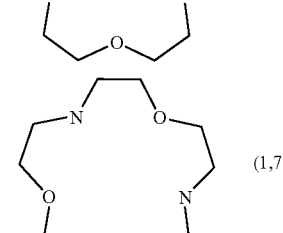

(1,7-diaza-15-crown-5),

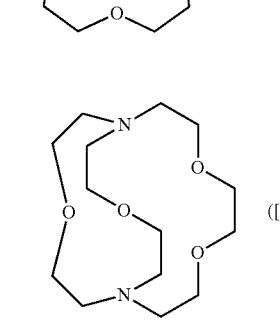

([2.1.1]cryptand), ([2.1.1N] cryptand),

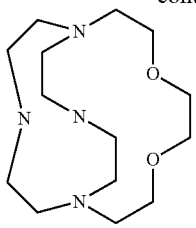

([2.1N.1N] cryptand),

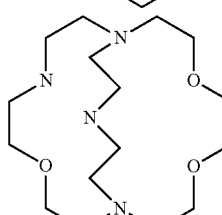

([2.2N.1N] cryptand),

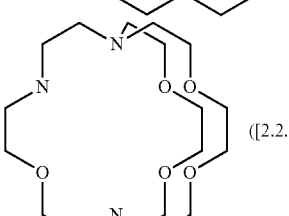

([2.2.2N] cryptand), ([2.2N.2N]cryptand),

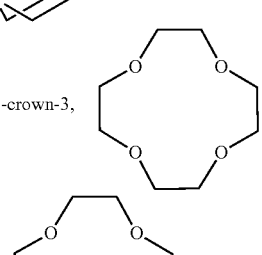

aza-9-crown-3, 12-crown-4,

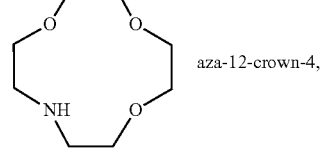

aza-12-crown-4, and combinations thereof. Any hydrogen atoms in these structures are assumed.

Further, although not cyclic, in an example of the present disclosure, the chelating agent may be a polymer functionalized with a podand. A podand is an acyclic polyether ligand that includes donor-group-bearing arms that can complex with a metal cation.

Examples of the present disclosure show that a combined analysis of electron-paramagnetic-resonance (EPR) and atomic absorption spectroscopy (AAS) or inductively coupled plasma (ICP) emission spectroscopy data can determine both manganese dissolution rates and relative $Mn^{3+}$ amounts. This is accomplished by comparing the correlation between EPR and AAS data for $Mn^{2+}$ reference samples in an electrolyte solution with the same correlation for samples containing manganese cations dissolved from active materials ($LiMn_2O_4$, a.k.a. LMO and $LiNi_{0.5}Mn_{1.5}O_4$, a.k.a. LNMO) into the same electrolyte solution, over a duration of several weeks. Contrary to a widely held view, the present inventors show that $Mn^{3+}$ (present in amounts ranging from about 67% to about 78%), and not $Mn^{2+}$, is the dominant species among Mn ions dissolved from LMO. On the other hand, $Mn^{2+}$ (present in amounts ranging from about 56% to about 88%) is predominant among Mn ions dissolved from LNMO. Although the dissolution rate of LMO varies significantly for the two investigated materials (which may be due to the particle morphology and the presence of Cr as stabilizing dopant in one of the materials), the manganese ions' speciation appears independent of such details. Thus, the relative abundance of manganese ions in various oxidation states in the electrolyte solution depends mainly on the overall chemical identity of the active material (e.g., LMO vs. LNMO).

A clear understanding of the details related to manganese cations' dissolution is important for designing measures that will mitigate its consequences. However, there remains a lack of consensus about the mechanisms underlying manganese dissolution and its effects. The LMO spinel structure exhibits a phase change from cubic to tetragonal during electrochemical cycling. This structural change causes undesirable capacity fading in LMO, since the intercalation-deintercalation processes cannot be fully performed. A reason for the enhanced manganese dissolution observed in a $LiPF_6$ based electrolyte, when compared with solutions of other lithium salts in aprotic organic solvents, is acid attack due to the presence of hydrofluoric acid (HF) and other acidic species in the electrolyte solution. Furthermore, the hypothesis that $Mn^{3+}$ ions undergo a disproportionation reaction into soluble $Mn^{2+}$ and solid $Mn^{4+}$ has yet to be supported by experimental evidence. The average oxidation state of Mn cations in the $LiPF_6$/EC:DEC electrolyte solution from LMO-graphite cells extensively cycled at high temperature, as determined by X-ray absorption near-edge structure spectroscopy (XANES), is not +2, but approximately +3.3. However, no reports exist in the literature on the quantitative analysis of the manganese cations' speciation in lithium ion battery (LIB) electrolyte solutions.

Both $Mn^{2+}$ and $Mn^{4+}$ are paramagnetic species, and hence EPR active, while diamagnetic $Mn^{3+}$ is not active and hence "silent" in electron paramagnetic resonance (EPR). Atomic adsorption spectroscopy (AAS) and inductively coupled plasma (ICP) analysis, however, determine the total amount of manganese present in a sample, irrespective of the oxidation states of the ions present. A combined analysis of EPR and AAS (or ICP) data, as shown in the present disclosure, provides both qualitative and quantitative information regarding the manganese species present in a LIB electrolyte solution.

Examples of the present disclosure set forth a new methodology which quantifies the amount of $Mn^{3+}$ ions relative to the amounts of $Mn^{2+}$ and $Mn^{4+}$ ions present in a 1M $LiPF_6$/EC:DMC (1:1) electrolyte solution after prolonged exposure to LMO or LNMO powders, by comparing the correlation between EPR and AAS data for $Mn^{2+}$ reference samples with the same correlation for samples containing manganese cations dissolved from the active materials into the electrolyte solution over a duration of several weeks.

To further illustrate the present disclosure, examples are given herein. It is to be understood that these examples are provided for illustrative purposes and are not to be construed as limiting the scope of the disclosure.

Examples

Experimental

Two types of LMO were investigated, one obtained from TODA, Japan; the other from Yunnan Yuxihuilong Technology Co., Ltd., China. LNMO was obtained from TODA. The 1M $LiPF_6$/EC:DMC (1:1) electrolyte solution, was obtained from Ube Inc. $Mn^{2+}$ perchlorate hexahydrate salt ($Mn_2O_4 \cdot 6H_2O$) was purchased from Sigma-Aldrich. All the materials were used as-received, without further purification.

$Mn^{2+}$ reference solutions were generated by dissolving manganese perchlorate hexahydrate salt into the 1M $LiPF_6$/EC:DMC (1:1) standard electrolyte solution. All reference solutions were analyzed by EPR spectroscopy (50 µl samples were introduced into 0.8 mm diameter Vitrocom quartz capillaries which were sealed with epoxy after filling). CW (continuous wave)-EPR spectra were recorded at room temperature with a Bruker E500 Elexys spectrometer operating at 9.0-9.5 GHz at a microwave power of 10 mW, with a modulation amplitude of 4.0 G, time constant of 60 ms, and a receiver gain of 60 dB, and in a magnetic field scanned from 500 to 6,000 Gauss. All EPR measurements were normalized by the EPR response for $Fe^{3+}$ in the capillary tubes, with a g-factor of 4.310±0.001. The total Mn amount in every reference solution was also determined by atomic absorption spectroscopy, performed with a Perkin-Elmer atomic absorption spectrometer AAnalyst400 equipped with a Beckman Mn hollow cathode lamp (HCL), at 279.48 nm wavelength, slit 1.8/0.6 nm. A 0.1 ml volume of each reference solution was diluted with DD-DI water by a factor of 100 before the AAS measurements.

In order to investigate the dissolution of Mn ions from LMO and LNMO during storage in electrolyte, 1 gram amounts of each active material were introduced into PTFE tubes filled with 10 ml of standard solution (1M $LiPF_6$/EC:DMC 1:1), inside an argon dry box, and stored in a custom hermetic setup inside an argon-filled oven at 50° C., under constant stirring. Eight tubes were used for each active material. The tubes were removed from the oven and immediately analyzed. One week intervals were selected for sampling from the start of the dissolution experiment and continued over a duration of 8 weeks. The liquid and solid parts of the samples were separated by ultra-centrifugation (Eppendorf, Centrifuge 5702) for 20 minutes at 4,000 rpm, and the resulting aliquots were then filtered through a syringe filter (Whatman PTFE, 0.45 µm pore size) before performing EPR and elemental AAS analyses. All AAS reported measurements were performed for each sample within 2 hours after sample separation.

Results and Discussion

EPR signals for the reference $Mn^{2+}$ solutions with concentrations ranging from 1 to 500 mg/l are shown in FIG. 3 (a), and the corresponding EPR absorption spectra, obtained by integration of the signals are shown in FIG. 3 (b). The $Mn^{2+}$ ion has a 3d5 electronic configuration with total spin value S=5/2. The interaction between the $^{55}Mn$ nucleus and the unpaired electrons with overall spin 5/2 is the origin of the sextet of hyperfine lines seen in the spectra. The g values for all recorded spectra are 2.0244±0.0001. The intensities of the EPR spectra depend on the concentration of the $Mn^{2+}$ ions in the samples. FIG. 3 indicates that at higher $Mn^{2+}$ ion concentrations, both a larger amplitude and an increasing superposition of exchange interactions of nearby Mn ions occurs. Evidence of this is seen in the hyperfine lines of the EPR signal; the offset between adjacent features in the staggered data increasing with concentration. Dipole and exchange interactions between unpaired spins of $Mn^{2+}$ increase as the ion concentration increases and thus cause the superposition (staggering of adjacent features) observed in the spectra.

In order to perform a quantitative analysis, the EPR signal for each $Mn^{2+}$ reference solution was integrated twice. The integrated EPR intensity and the Mn amounts detected by AAS were presented as functions of the calculated $Mn^{2+}$ concentrations in the graph shown in FIG. 11.

Figure 11:
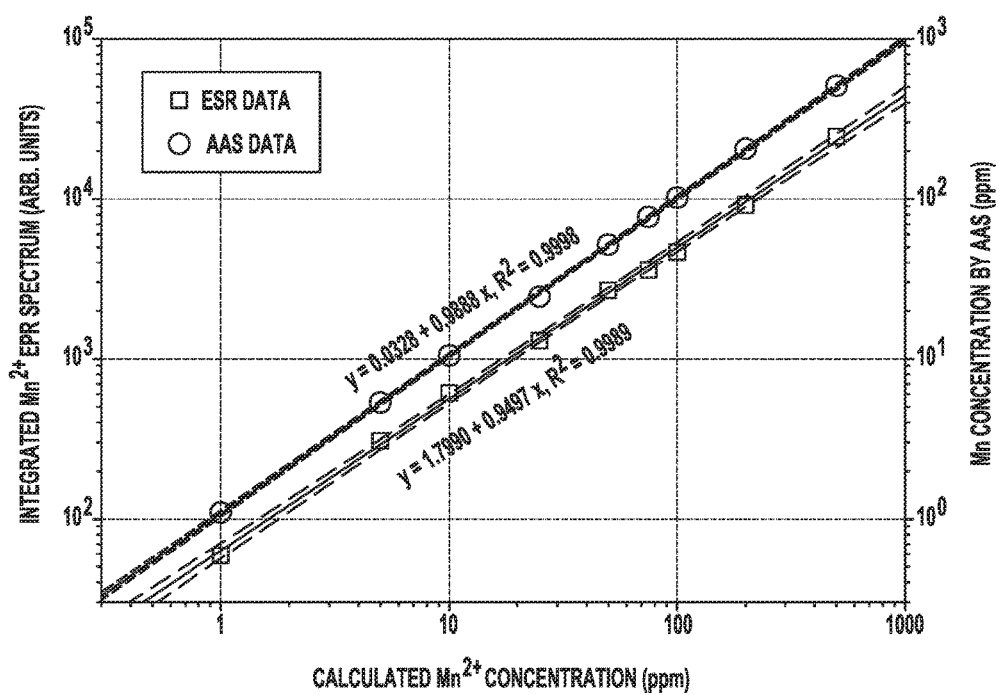
FIG. 11 is a graph showing integrated EPR intensity (left y-axis) and the Mn amounts detected by AAS (right y-axis) as functions of the calculated $Mn^{2+}$ concentration.

As can be seen in FIG. 11, excellent linearity is observed in both the EPR and AAS data for the reference solutions.

The slopes for the AAS and EPR data on the log-log plots are, respectively, 0.989 and 0.950. Thus the respective deviations from a slope 1 line are 1.1% and 5.3%. The greater deviation from slope 1 for the integrated EPR spectra may be caused by the baseline subtractions necessary when performing the two successive integrations of the EPR data. The $Mn^{2+}$ EPR calibration line from the graph above was then used for determining the amounts of $Mn^{2+}$ ions dissolved from LMO and LNMO spinel materials during the 8 weeks long dissolution experiment. The correlation between the doubly integrated EPR signals and the AAS data for the reference solutions was then compared with the same correlation for solutions with unknown amounts of total manganese and cations speciation.

Figure 12A:
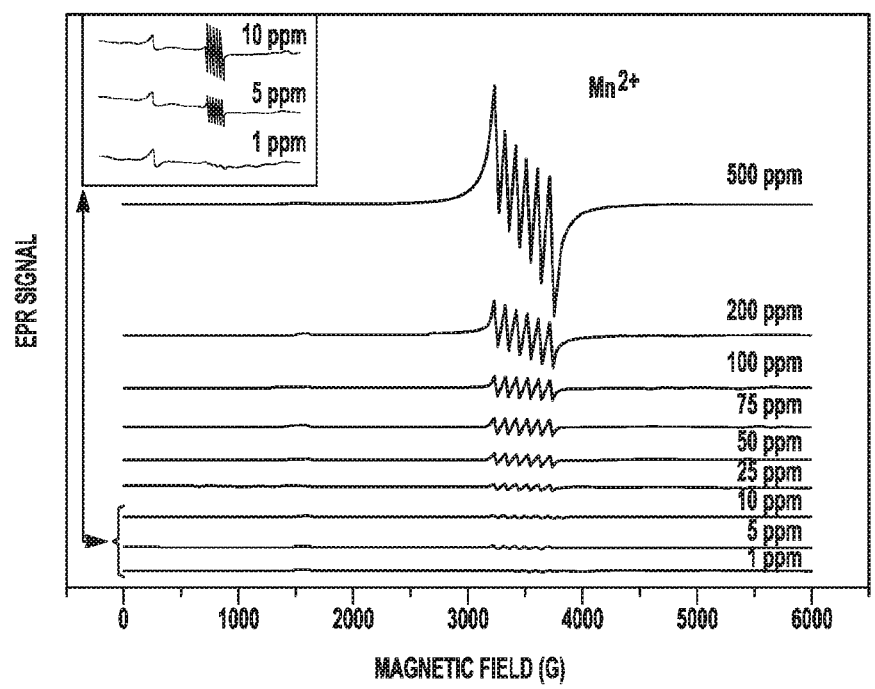
FIG. 12A is a graph showing EPR data for reference solutions of $Mn^{2+}$ perchlorate hexahydrate in 1M $LiPF_6$/EC:DMC (1:1)
Figure 12B:
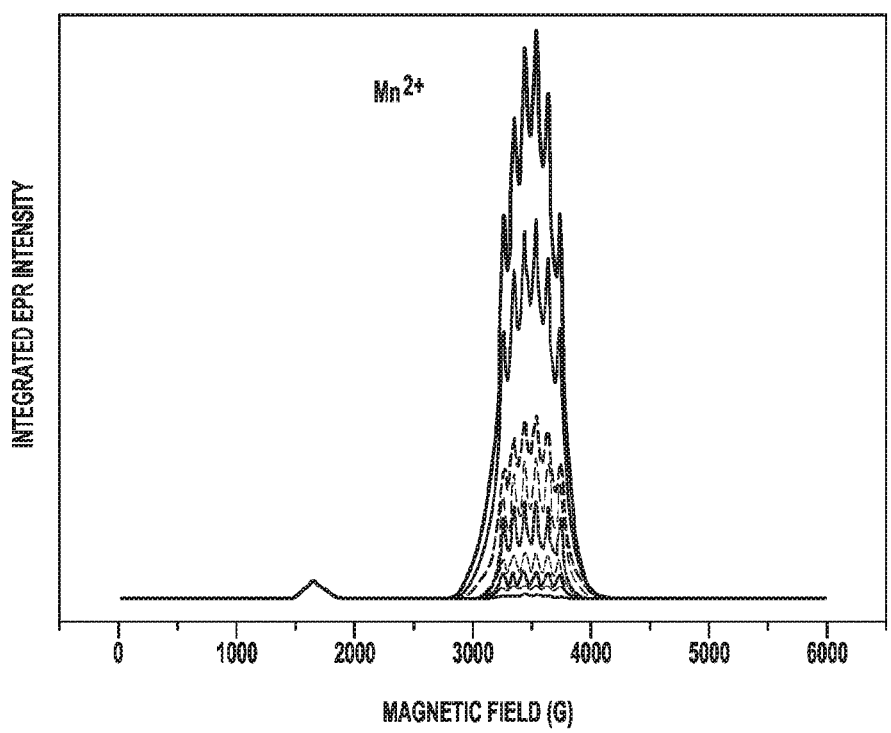
FIG. 12B is a graph showing EPR spectra for the $Mn^{2+}$ reference solutions, obtained by integration of the data from the graph shown in FIG. 12A.

The graph in FIG. 12A shows EPR data for reference solutions of $Mn^{2+}$ perchlorate hexahydrate in 1M $LiPF_6$/EC:DMC (1:1). The inset shows the signal of the $Fe^{3+}$ (g=4.310) impurity in the capillary, serving as an internal reference, as well as the $Mn^{2+}$ signal (g=2.024). The graph in FIG. 12B shows EPR spectra for the $Mn^{2+}$ reference solutions, obtained by integration of the data from the graph shown in FIG. 12A.

A sextet EPR signal corresponding to dissolved $Mn^{2+}$ ions was observed for the Mn cations dissolved into the electrolyte solution from either LMO or LNMO powders. The g values for the LMO samples under test were 2.027±0.001, whereas the g value for pure $Mn^{2+}$ (i.e., for the reference solutions) is 2.024±0.001. These observations suggest the presence of additional EPR-active Mn species in the solutions which contained the investigated materials, i.e., a mixture of Mn cations with oxidation states +2 and +4. Note that the EPR signal for $Mn^{2+}$ cations dissolved from LNMO, is very similar to that for pure $Mn^{2+}$ ions. The g value for these spectra is 2.025±0.001, which is identical—within measurement uncertainties—to that of pure $Mn^{2+}$. Based on these results, the present inventors concluded that $Mn^{2+}$ ions predominate in the solution which contained the LNMO powder.

Figure 7:
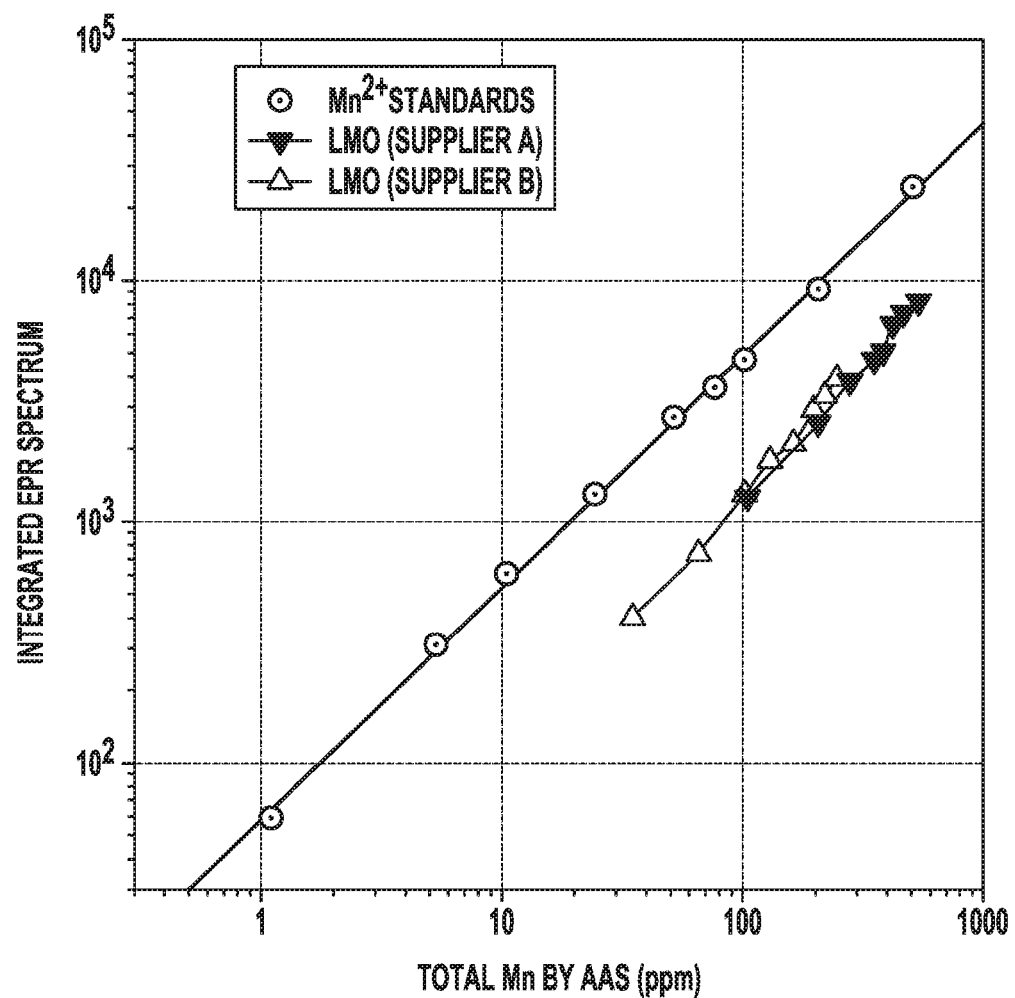
FIG. 7 is a graph showing the correlation between the integrated Electronic Paramagnetic Resonance (EPR) spectra (Y-axis) and the total concentrations of manganese ions (measured by Atomic Absorption Spectroscopy (AAS), in ppm) for a set of $Mn^{2+}$ reference solutions, compared to the same correlation for the manganese cations dissolved from two $Li_xMn_2O_4$ (LMO) powders.

FIG. 7 is a graph showing the correlation between the integrated EPR spectra and the total concentrations of manganese ions (measured by AAS) for the $Mn^{2+}$ reference solutions, compared to the same correlation for the manganese cations dissolved from two LMO powders. The experiment was done with LMO powders A and B in an electrolyte solution (no battery) at 60° C. Aliquots/data points were collected at 1 week intervals, respectively, from the start of the dissolution experiment, and the total Mn and the $Mn^{3+}$ fraction in each solution were determined within an hour of collecting an aliquot. EPR-AAS log-log correlation line: y=(1.768±2.2%)+(0.950±1.3%) x, $R^2$=0.999.

FIG. 7 shows that the EPR-AAS correlation line for each of the two investigated LMO materials falls below the correlation line for the $Mn^{2+}$ reference solutions obtained with $Mn(ClO4)_2$. This indicates that both $Mn^{2+}$ and $Mn^{4+}$ are minority species among the Mn cations dissolved from the two LMO materials into the electrolyte solutions, and that $Mn^{3+}$ (which is silent in EPR but can be detected by either AAS or ICP) is the dominant species in the two solutions.

Figure 8A:
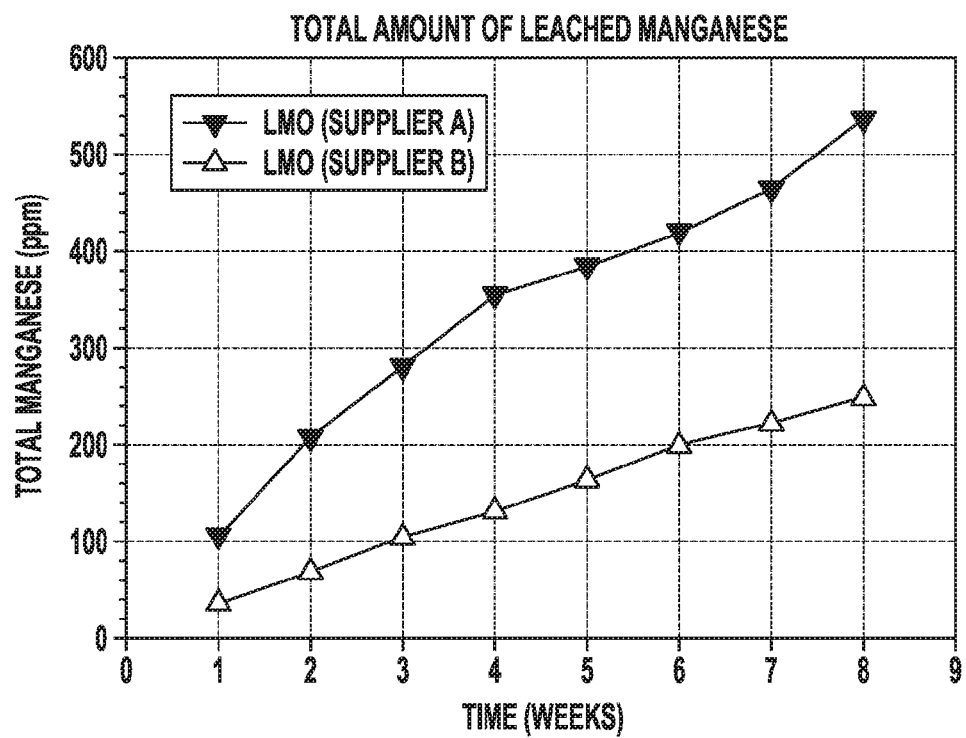
FIG. 8A is a graph showing total manganese amounts (in ppm, Y-axis) dissolved at 50° C. from the two $Li_xMn_2O_4$ (LMO) powders into a 1M $LiPF_6$/EC:DMC (1:1) electrolyte solution, as a function of time (in weeks, X-axis)

FIG. 8A is a graph showing total manganese amounts (in ppm) dissolved at 50° C. from the two $Li_xMn_2O_4$ (LMO) powders into a 1M $LiPF_6$/EC:DMC (1:1) electrolyte solution, as a function of time (in weeks). It is apparent that the Mn dissolution rate for the LMO powder from Yunan Yuxihuilong is significantly lower than the Mn dissolution rate for the LMO powder from TODA. It is likely that the difference between the dissolution rates of the two LMO materials are due to the presence of Cr as an additional stabilizing element in the LMO from Yunnan Yuxihuilong and its absence in the LMO from TODA.

Figure 8B:
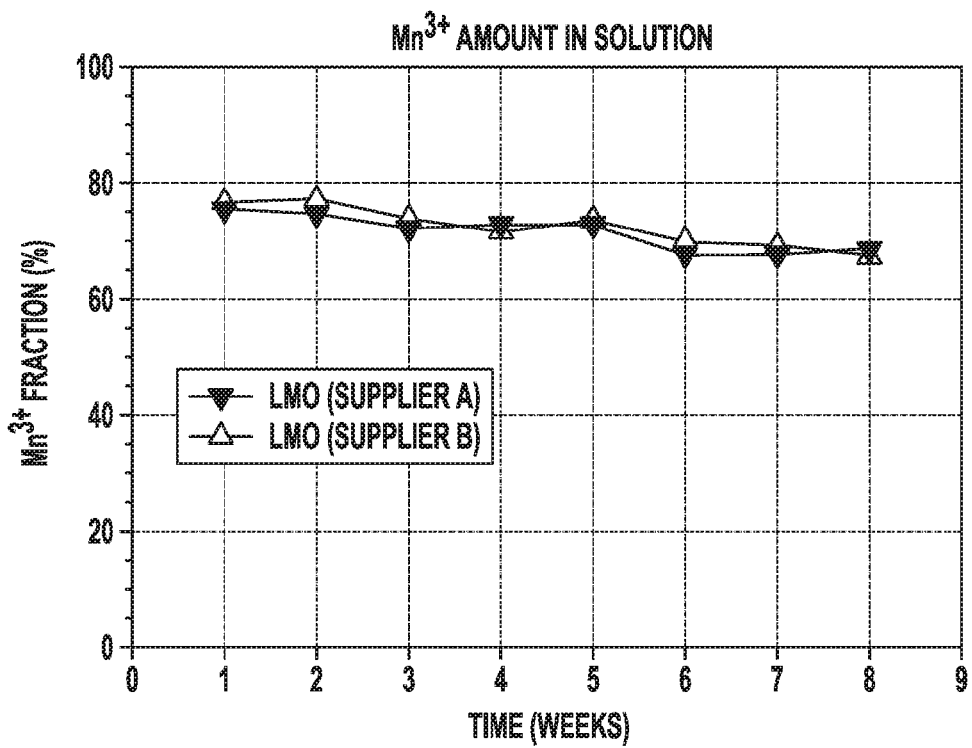
FIG. 8B is a graph showing fraction of $Mn^{3+}$ ions (in percent, Y-axis) among the dissolved manganese ions (from FIG. 8A), as a function of time (in weeks, X-axis)

FIG. 8B is a graph showing fraction of $Mn^{3+}$ ions among the dissolved manganese ions, as a function of time (in weeks). FIG. 8B, which displays the fraction of $Mn^{3+}$ ions among the Mn ions dissolved from the two active material powders, indicates that both $Mn^{2+}$ and $Mn^{4+}$ are minority species in the solutions containing LMO powders, with $Mn^{3+}$ in an abundance of 67 to 78%. It can be seen that the fraction of $Mn^{3+}$ cations in the LMO containing solutions decreases slowly over time, likely to a disproportionation reaction into $Mn^{2+}$ and $Mn^{4+}$ occurring in the liquid state.

Figure 9A:
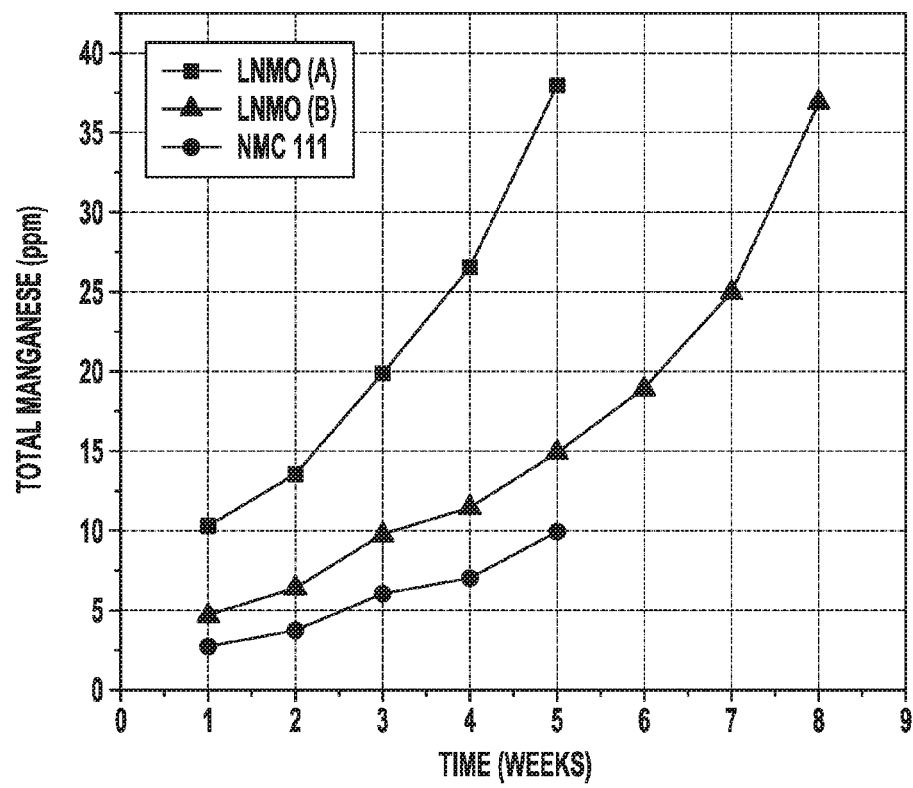
FIG. 9A is a graph showing total manganese amounts (in ppm, Y-axis) dissolved at 60° C. from $Li_xMn_{0.33}Ni_{0.33}Co_{0.33}O_2$ (NMC 111) and two $Li_xNi_{0.5}Mn_{1.4}O_4$ (LNMO (A) and (B)) powders into a 1M $LiPF_6$/EC:DMC (1:1) electrolyte solution, as a function of time (in weeks, X-axis)
Figure 9B:
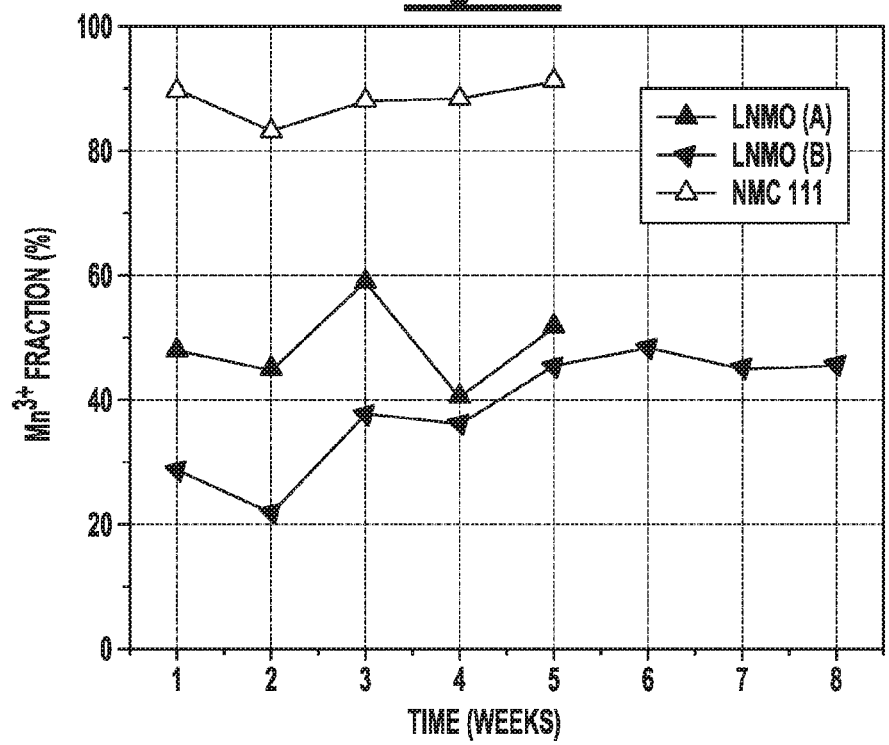
FIG. 9B is a graph showing fraction of $Mn^{3+}$ ions (in percent, Y-axis) among the dissolved manganese ions (from FIG. 9A), as a function of time (in weeks, X-axis)

FIG. 9A is a graph showing total manganese amounts (in ppm) dissolved at 60° C. from $Li_xMn_{0.33}Ni_{0.33}Co_{0.33}O_2$ (NMC 111) and two $Li_xNi_{0.5}Mn_{1.4}O_4$ (LNMO (A) and (B)) powders into a 1M $LiPF_6$/EC:DMC (1:1) electrolyte solution, as a function of time (in weeks). FIG. 9B is a graph showing fraction of $Mn^{3+}$ ions (in percent, Y-axis) among the dissolved manganese ions (from FIG. 9A), as a function of time (in weeks, X-axis). From FIG. 9A, it is clear that the amount of Mn dissolved from the NMC 111 is significantly lower than that from the two LNMO materials, which behave differently with respect to dissolution themselves. For any one given time, much more Mn dissolves from the Type A LNMO than from the Type B LNMO material. The fraction of the $Mn^{3+}$ in the solution (FIG. 9B) is about 90% for NMC 111 and practically constant over a duration of 5 weeks. The $Mn^{3+}$ fraction for LNMO is significantly lower, in the range of 20% to 60% for both Type A and Type B materials, and tends towards the same value of approximately 45-50% as the duration of the experiment increases past three weeks.

Figure 10A:
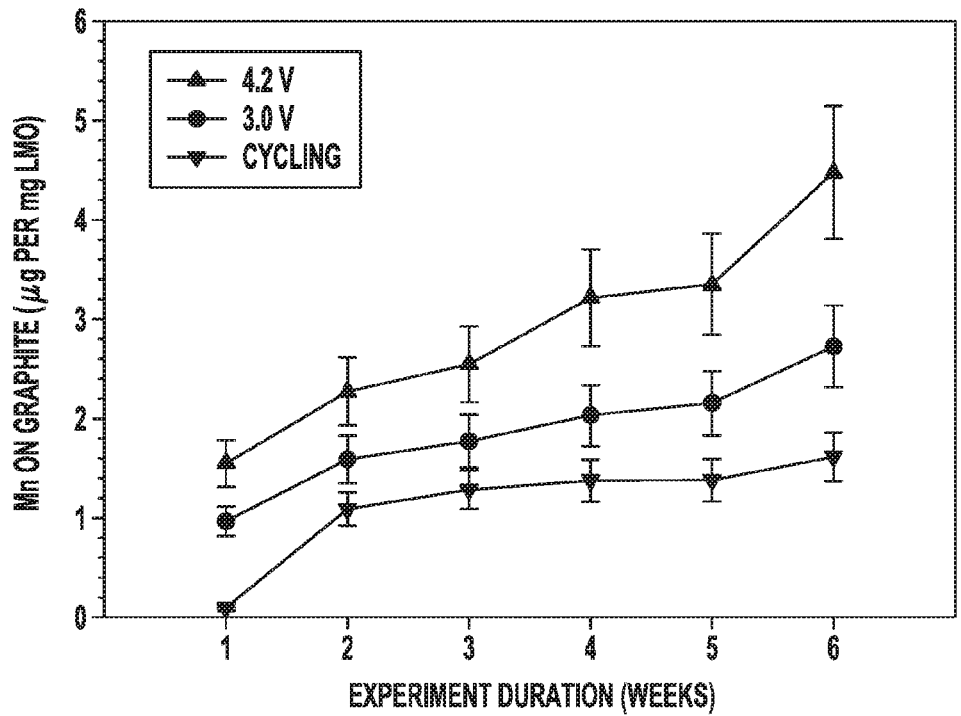
FIG. 10A is a graph showing Mn content on the graphite negative electrode (in µg per mg LMO, Y-axis) as a function of time (in weeks, X-axis), of LMO-graphite cells over the duration of the electrochemical tests at 60° C.
Figure 10B:
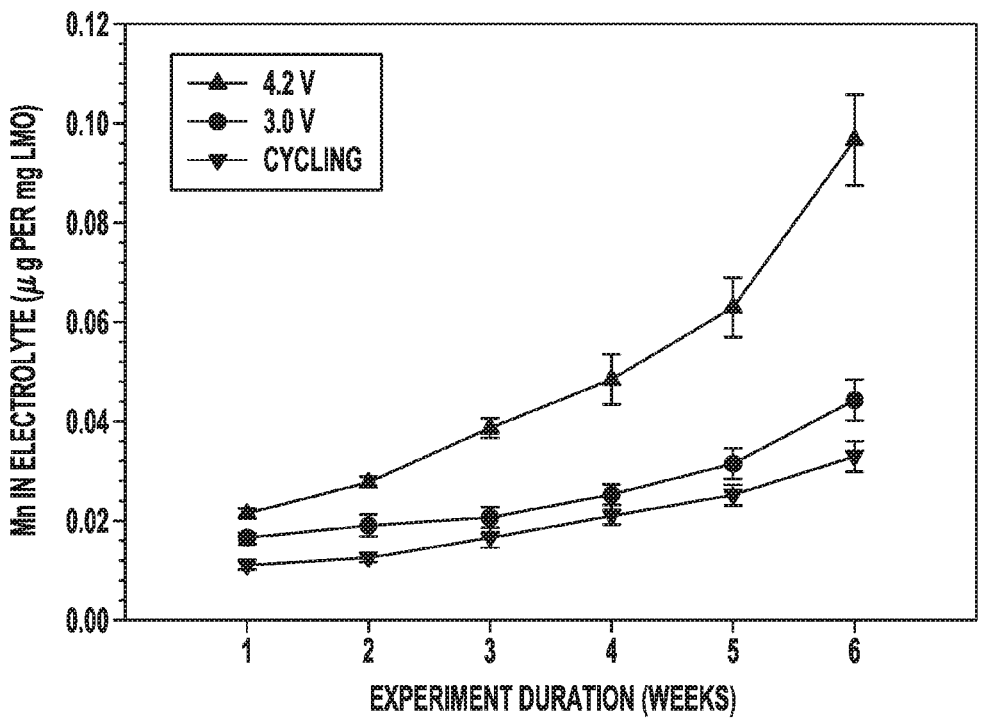
FIG. 10B is a graph showing Mn content in the 1M $LiPF_6$/EC:DMC electrolyte solution (in µg per mg LMO, Y-axis) as a function of time (in weeks, X-axis), of LMO-graphite cells over the duration of the electrochemical tests at 60° C.

FIG. 10A is a graph showing Mn content on the graphite negative electrode (in μg per mg LMO) as a function of time (in weeks), of LMO-graphite cells over the duration of the electrochemical tests at 60° C. FIG. 10B is a graph showing Mn content in the 1M $LiPF_6$/EC:DMC electrolyte solution (in μg per mg LMO) as a function of time (in weeks), of LMO-graphite cells over the duration of the electrochemical tests at 60° C. FIGS. 10A and B display the Mn contents in the negative electrode and in the electrolyte, respectively. The trends for Mn dissolution are obvious: maximum during 4.2 V hold, moderate during 3.0 V hold, and minimum during cycling experiments.

Figure 13A:
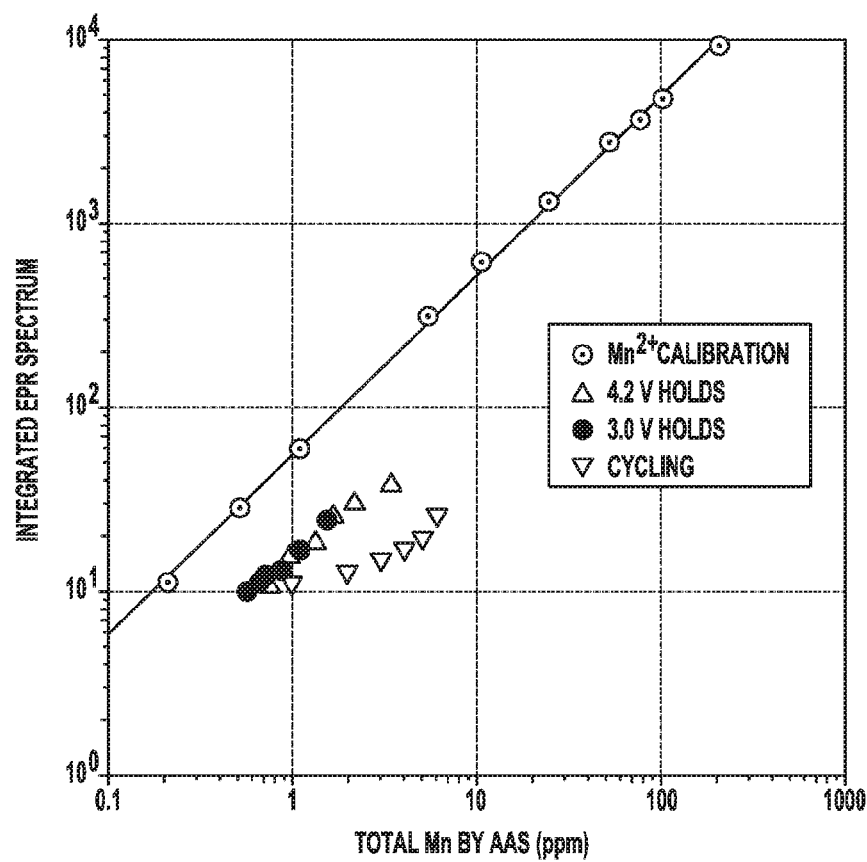
FIG. 13A shows the correlation between the integrated EPR spectrum intensity and the total Mn (in ppm) determined by AAS.
Figure 13B:
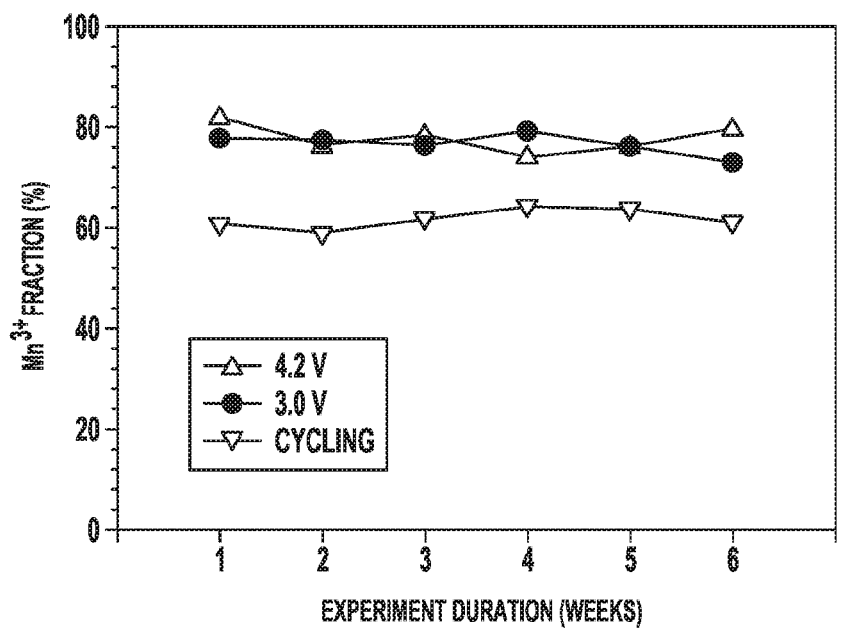
FIG. 13B shows the fraction of $Mn^{3+}$ in the electrolyte solution from LMO-graphite cells after cycling and potential hold testing at 60° C.

The graph in FIG. 13A shows the correlation between the integrated EPR spectrum intensity and the total Mn (in ppm) determined by AAS; and the graph in FIG. 13B shows the Fraction of $Mn^{3+}$ in the electrolyte solution from LMO-graphite cells after cycling and potential hold testing at 60° C.

The graph in FIG. 13A displays the correlation between AAS (total Mn) and EPR (combined contributions only from $Mn^{2+}$ and $Mn^{4+}$) data, while the graph in FIG. 13B shows the fractions of $Mn^{+3}$ found in the electrolyte solutions. FIG. 13B shows that the electrolyte solutions from all cells subjected to electrochemical testing have fractions of $Mn^{3+}$ which are constant with time, i.e., do not depend on the amount of Mn dissolved into the electrolyte solution, but depend on test conditions. The fraction of $Mn^{3+}$ in fully charged and fully discharged cells is in the 57%-80% range, while that from cells subjected to cycling is in the 60%-65% range.

The data from the graphs in FIGS. 13A and 13B were obtained from three sets of tests on LMO-graphite cells:

(1) cycling at C/5 rate (5 hours for charging, 5 hours for discharging), between 3.0 V and 4.2 V voltage limits;

(2) potential hold at 3.0 V, in fully discharged state (that is, the cell is connected to a battery cycler which has a voltage of 3.0 V across its terminals); and (3) potential hold at 4.2 V, in fully charged state.

Eighteen (18) coin cells were run for each of the three experiments. Over the duration of 6 weeks, three cells from each test group were taken off the test and disassembled inside a glove box. The cells were immediately opened, and the graphite electrode and electrolyte filled separators were harvested for further analyses (total Mn in graphite and electrolyte solution, plus $Mn^{3+}$ fraction in the electrolyte solution).

Table 1 below shows the trapping capacity of various ion chelating polymers for $Mn^{2+}$ and $Mn^{+3}$ ions.

TABLE 1

| No. | SAMPLE | Trapping Capacity, meq/g | |
|---|---|---|---|
| | | $Mn^{2+}$ | $Mn^{3+}$ |
| 1 | P (10% DVB - 90% VB-IDANa$_2$), commercial | 1.39 | 0.92 |
| 2 | P( 5% DVB - 95% VB-IDANa$_2$), commercial | 0.89 | 0.84 |
| 3 | P (3% DVB - 97% VB-A15C5), example synthesis | 0.24 | 0.82 |
| 4 | P (20% DVB - 80% VB-A15C5), example synthesis | 0.89 | 0.46 |
| 5 | P (20% DVB - 80% VB-A15C5), example synthesis | 0.46 | 0.07 |
| 6 | P (40% DVB - 60% VB-A15C5), example synthesis | 0.08 | 0.70 |
| 7 | P (20% DVB - 80% VB-A12C4), example synthesis | 0.90 | 0.33 |
| 8 | P (20% DVB - 8 and 8, in a 6.70% VB-IDANa$_2$), example synthesis | 0.04 | 1.23 |
| 9 | P (E-alt-MALi$_2$), example synthesis | 0.57 | 0.37 |

In Table 1 above, P(X % DVB–(1–X) % VB–AN$_1$CN2)=copolymer of X % cross-linked styrene-divinylbenzene polymer functionalized with aza-N1-crown-N2. This shows, e.g., that #1 and #2 have approximately equal abilities to trap both $Mn^{2+}$ and $Mn^{3+}$ (particularly material (#2). On the other hand, #3 very much prefers $Mn^{3+}$, while both #4 and #5 prefer to trap $Mn^{2+}$.

Assuming cells have graphite negative electrodes:

1) When considering a cell with an LMO positive electrode, the $Mn^{3+}$ fraction during its field operation is likely in the 70% range. (Cycling and stand at open circuit voltage in some state of charge between 10% and 100% are its most likely states during field use.) The $Mn^{2+}$ to $Mn^{3+}$ ratio is thus 3:7. From Table 1, it can be seen that the most efficient trapping of the Mn cations in such a cell is from a mixture of samples 2 and 9 in a 6.7:2.3 mass ratio.

2) For a cell containing NMC 111, where $Mn^{3+}$ is as high as 90%, the optimal trapping material for scavenging both ions appears to be #6. A similar overall trapping efficiency could also be achieved if one were to consider materials #8 and #5 in a mass ratio of 2.2:7.5, since considerations other than mere Mn trapping capacity (such as processing properties during separator fabrication and/or mechanical properties of the separator, etc.) may be considered when choosing materials.

3) For an LNMO containing cell, where the $Mn^{3+}$ fraction is close to 50%, the optimal trapping material appears to be #2. However, the same trapping efficiency could be achieved with materials 5 and 8 in an approximate ratio of 1:0.4. The choice may again involve considerations other than mere trapping efficiency.

Example Separator

Examples of a novel multi-functional separator were fabricated by embedding a P(E-alt-MALi$_2$) cation chelating polymer into a poly(vinylidene fluoride-hexafluoropropylene) (or PVdF-HFP) matrix through a phase-inversion process. Unless otherwise stated, all commercial materials were used throughout this work without further purification or modification, and all work was performed at room temperature (about 25° C.) unless another temperature is specified.

Synthesis and Characterization of the P(E-Alt-MALi$_2$) Material

The synthetic scheme as well as the chelating mechanism for P(E-alt-MALi$_2$) are shown immediately below.

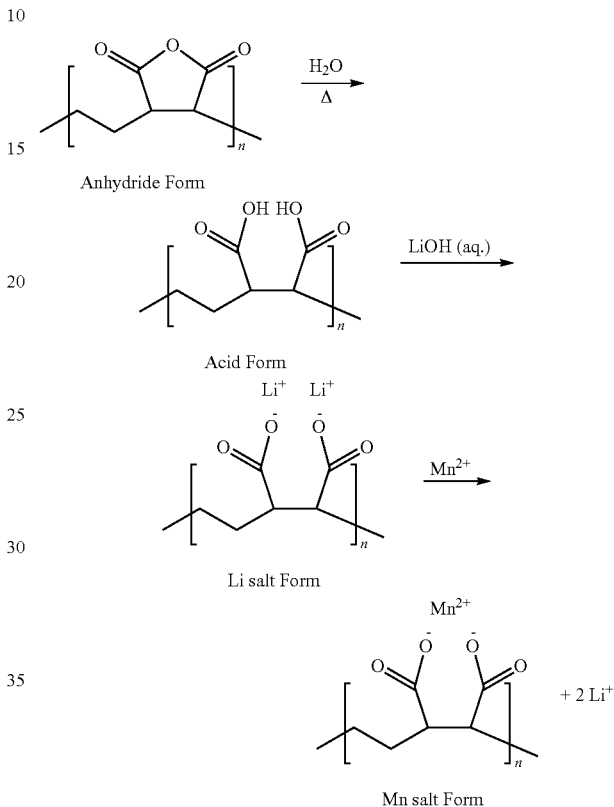

Synthesis and Chelating Mechanism of P(E-Alt-MLi2)

P(E-alt-MALi$_2$) was synthesized by the hydrolysis of poly(ethylene-alt-maleic anhydride) (Sigma Aldrich Cat. No. 188050) with LiOH (Sigma Aldrich Cat No. 442410). A 10 gram amount of poly(ethylene-alt-maleic anhydride) was dissolved in 100 ml of doubly distilled deionized (DD-DI) water and stirred at 40° C. for approximately 14 hours, until a clear solution was obtained, having a pH value of about 7. This solution was then drop-wise added to 100 ml of an aqueous 2M LiOH solution under constant stirring at 30° C., while monitoring its pH. Addition of poly(ethylene-alt-maleic acid) solution was continued until the pH reached a value of 7.5 to 8. The resulting P(E-alt-MALi$_2$) solution was then frozen at −18° C., followed by freeze-drying at −80° C. under <10 mTorr vacuum. A fine P(E-alt-MALi$_2$) powder was prepared by grinding the solid pieces resulting from the freeze-drying process. The resulting powder as well as the poly(ethylene-alt-maleic anhydride) precursor were characterized by FTIR spectroscopy, using a Model iS50 Nicolet instrument equipped with a Ge ATR crystal with 2 cm$^{-1}$ resolution. The disappearance of the peak at 1,775 cm$^{-1}$ (the C=O group in the anhydride), as well as the presence of two peaks at 1,550 cm$^{-1}$ and 1,405 cm$^{-1}$ (both related to the —COOLi$^+$ groups), confirm the complete hydrolysis of poly(ethylene-alt-maleic anhydride).

Fabrication of the Functional Separator

Acetone (99.5%, Sigma Aldrich Cat. No. 320110) and dry ethanol (99.8% Sigma Aldrich Cat. No. 32221) were chosen as the matrix ("true") solvent and anti-solvent, respectively, for preparing the functional separator by phase-inversion. Three grams of PVdF-HFP copolymer (Solvay Cat No. 21216) were dissolved in 81 grams of acetone at 35° C., under constant stirring for 3 hours. Dry ethanol (10 grams) was then added drop-wise into the stirred acetone-copolymer solution, until it became transparent. Six grams of finely ground polymeric chelating Li-salt was incorporated into the copolymer blend, and stirring continued for 12 hours at room temperature. The optimized mass compositions of PVdF-HFP copolymer, chelating P(E-alt-MALi$_2$) polymer filler, solvent and anti-solvent in the resulting suspension were 3%, 6%, 81%, and 10%, respectively. The copolymer-filler suspensions were then cast onto glass plates using a doctor blade with a 200 µm gap. The composite membranes were vacuum dried for 14 hours at 80° C., subsequent to the evaporation of the solvent mixture in air. The mass ratio between the copolymer and the filler in the dry matrix of the separator was 1:2, corresponding to a P(E-alt-MALi$_2$) loading of about 2 mg·cm$^{-2}$ in the separator.

Determination of the Chelating Capacity for Manganese Ions

Stock solutions with about 15 mM Mn$^{2+}$ and about 7.5 mM Mn$^{3+}$ concentrations were prepared by dissolving, respectively, manganese (II) perchlorate hexahydrate (99% purity, Alfa Aesar Cat No. 359386) and manganese (III) acetate dihydrate (97% purity, Sigma Aldrich Cat No. 215880) in 1M LiPF$_6$/EC:DMC (1:1 v/v) (UBE Inc.). 50 mg amounts of dry chelating material (pristine PE-alt-Li$_2$ powder or pieces of functional separator) were introduced into a 5 ml stock solution contained in polypropylene tubes that were sealed and subsequently stirred for 5 days inside an argon filled glove box. The solids and the solution were then separated by means of an ultra-centrifuge operating at 12,000 RPM. 0.1 ml aliquots from each supernatant were diluted by a factor of 100 in double distilled deionized (DD-DI) water, and their Mn concentrations were determined by inductively coupled plasma optical emission spectroscopy (ICP-OES) using an Ultima 2 instrument from Jobin-Yvon Horiba. Similarly, a 0.1 ml volume of stock solution was diluted by a factor of 100 in DD-DI water, to serve as a reference solution for the ICP-OES measurements. The chelating capacity for Mn$^{3+}$ ions was then determined from the differences between the total manganese contents in the test and in the reference solutions.

Electrode Fabrication, Cell Assembly, and Electrochemical Testing

LMO from Yunan Yuxihuilong Technology Co. Ltd. was used in these experiments. Composite positive electrodes were prepared by spreading a slurry of a mixture of 85 wt % LMO, 10 wt % Super P Li carbon black conductive filler (IMERS Ltd.), 5 wt % PVdF binder (from Solvay) and N-methyl pyrrolidone (NMP, from Sigma Aldrich) as dispersing solvent, onto Al current collectors using a doctor blade with a 100 µm gap, followed by vacuum drying at 120° C. for 14 hours. Composite graphite negative electrodes were prepared in a similar fashion, by doctor-blading a slurry of 90 wt % graphite (from SMG Hitachi Inc), 3 wt % carbon black Super P Li (IMERS Ltd.), 7 wt % PVdF binder (from Solvay), and N-methyl pyrrolidone (NMP, from Sigma Aldrich) as dispersing solvent, onto Cu current collectors. (The mass ratio of composite electrode mass to NMP mass in the slurry was 1:1.) Drying of the electrodes was performed as previously mentioned. Active material loadings were about 10.8 mg cm$^{-2}$ and about 4.5 mg cm$^{-2}$, respectively, on the Al and Cu current collectors. The example functional separator was tested in both LMO/Li and LMO/graphite coin cells (model: 2325, NRC, Canada) containing 1 M LiPF$_6$/EC:DMC (1:1 w/w) electrolyte and 1.4 cm diameter electrodes. Their performance was compared against that of cells containing a baseline separator. The coin cells had either a single layer of functionalized separator or two layers of baseline separator, and electrodes with a geometric area of 2.83 cm$^2$ (1.93 cm diameter). The cells were assembled inside an argon filled glove box with moisture and oxygen levels <1 ppm.

Four formation cycles at C/10 rate were conducted at 30° C. on each cell prior to each cycling test, using an Arbin Model BT2000 multichannel battery cycler. Electrochemical AC impedance measurements were conducted on the cells with a Solartron Instruments 1225 HF frequency response analyzer and a Solartron Instruments 1287 electrochemical interface, both after formation (4 cycles at C/10 rate) and after 100 cycles at C/5 rate, prior to each cell's disassembly. Impedance spectra were collected at open circuit voltage in the discharged state (at about 3 V), with a 5 mV excitation amplitude, over the 100 kHz to 10 mHz frequency range.

All cells were immediately disassembled after the completion of 100 galvanostatic cycles and the associated post-cycling electrochemical AC impedance measurements, to harvest both the electrodes and electrolyte filled separators for further analyses. Mn amounts in the functional separator and in the negative electrodes from both half and full cells were determined by ICP-OES. The Mn ions were eluted from the used separators with 3 M HCl and their concentrations were measured after 100× dilution with DD water. The separators from yet another set of LMO-graphite cells were washed with DMC after the cell disassembly and characterized by FTIR. The Mn contaminated Li electrodes from LMO-Li cells were dissolved by DD-DI water, and the Mn content of the solutions was determined by ICP-OES without any prior dilution. The Cu supported graphite negative electrodes from LMO-graphite cells were dissolved in aqua regia (HCl:HNO$_3$=3:1). The Mn containing aliquots were then diluted by a factor of 100 with DD-DI water, and the Mn concentrations were determined by ICP-OES. In order to assess any structural changes in the LMO material during cycling, X-ray diffraction (XRD) was performed on the positive electrodes from cells with functional as well as baseline separators using a Bruker Inc. (Germany) AXS D8 ADVANCE diffractometer (reflection θ-θ geometry, Cu Kα radiation, receiving slit 0.2 mm, high-resolution energy-dispersive detector), with a 0.5 second/step data collection time and a 0.049° step size. Finally, FTIR spectra were also collected for the functionalized separators in both their pristine (as-prepared) state and after harvesting them from LMO-graphite cells after the high-temperature cycling test, using a Model iS50 Nicolet instrument.

Characterization of the P(E-Alt-MALi$_2$) Functional Separator

The chelating capacity for Mn$^{3+}$ cations of the P(E-alt-MALi$_2$) material in powder form and when incorporated in the functional separator was 0.37 and 0.33 mM·g$^{-1}$, respectively; the corresponding numbers for Mn$^{2+}$ cations are 0.56 and 0.51 mM·g$^{-1}$, respectively. The about 10% reduction in chelating capacity for the P(E-alt-MALi$_2$) material when embedded in the separator is likely due to blocking of the chelating groups by the copolymer matrix.

CONCLUSIONS

The present inventors have demonstrated that $Mn^{3+}$, and not $Mn^{2+}$, is the prevalent manganese cation dissolved from LMO powders into $LiPF_6$ salt solutions of mixed organic carbonate solvents. In the present powder dissolution experiments, performed at 50° C. over 8 weeks' duration, the present inventors showed that for LMO from TODA and from Yunan Yuxihuilong, about 70% to about 80% of the dissolved Mn cations are $Mn^{3+}$, irrespective of significant differences in the manganese dissolution rates, morphology, or Cr substitution in the two materials, as well as experiment duration. On the other hand, $Mn^{2+}$ is the dominant manganese species in solutions with manganese cations dissolved from LNMO. The present inventors have shown that the relative abundance of ions in various oxidation states depends mainly on the overall chemical identity of the positive electrode active material, i.e., $LiMn_2O_4$ or $LiNi_{0.5}Mn_{1.5}O_4$.

The present inventors have also demonstrated that it is possible to determine the amount of $Mn^{3+}$ ions relative to other manganese species dissolved from positive electrode materials into an electrolyte solution, through a combination of high sensitivity EPR spectroscopy and AAS/ICP measurements. This method is a novel approach to the identification of $Mn^{x+}$ solution species and towards identifying the physico-chemical phenomena responsible for the dissolution of transition metal ions from positive electrodes of Li-ion batteries, as well as the Li-ion battery performance degradation initiated by, and related to, manganese dissolution.

It is to be understood that the ranges provided herein include the stated range and any value or sub-range within the stated range. For example, a range from about 0.05% to about 5% should be interpreted to include not only the explicitly recited limits of about 0.05% to about 5%, but also to include individual values, such as 0.07%, 3.5%, etc., and sub-ranges, such as from about 0.25% to about 4%, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A lithium ion battery, comprising:
   a positive electrode including a binder material;
   a negative electrode including a binder material;
   a nanoporous or microporous polymer separator soaked in an electrolyte solution, the nanoporous or microporous polymer separator operatively disposed between the positive electrode and the negative electrode; and
   at least two different chelating agents selected to complex with: i) two or more different transition metal ions; ii) a transition metal ion in two or more different oxidation states; or iii) both i) and ii);
   wherein the at least two different chelating agents to complex with transition metal ions in a manner sufficient to not affect movement of lithium ions across the nanoporous or microporous polymer separator during operation of the lithium ion battery;
   wherein the at least two different chelating agents are at least one of: dissolved or dispersed in the electrolyte solution; grafted onto the polymer of the nanoporous or microporous polymer separator as a substitute pendant group; attached to the binder material of the negative electrode; attached to the binder material of the positive electrode; disposed within pores of the separator; coated on a surface of the separator; coated on a surface of the negative electrode; and coated on a surface of the positive electrode;
   wherein the at least two different chelating agents are selected from: ion traps in molecular form selected from the group consisting of: polyamines, thiols, alkali metal salts of organic acids, and combinations thereof; polymers functionalized with alkali metal salts of organic acids; polymers functionalized with nitrogen-containing functional groups; and polymers functionalized with two or more functional groups;
   wherein the alkali metal salts of organic acids are multidentate structures selected from the group consisting of:
      tridentate structures selected from the group consisting of trisodium citrate, nitrilotriacetic acid trilithium salt ($Li_3NTA$), nitrilotriacetic acid trisodium salt ($Na_3NTA$), N-(2-carboxyethyl)iminodiacetic acid trilithium salt, trilithium 1,4,7-triazacyclononane-1,4,7-trisacetic acid salt ($Li_3NOTA$), and combinations thereof;
      tetradentate structures selected from the group consisting of tetralithium salt of 1,2-bis(o-aminophenoxy)ethane-N,N,N',N'-tetra acetic acid ($Li_4BAPTA$), tetralithium salt of 1,4,7,10-tetra aza cyclo dodecane-1,4,7,10-tetra acetic acid ($Li_4DOTA$), tetrasodium salt of ethylenediamine tetraacetic acid (EDTANa$_4$), ethyleneglycol-bis-(2-aminoethyl ether)-N, N, N', N'-tetra acetic acid tetralithium salt ($Li_4EGTA$), and combinations thereof;
      a pentadentate structure comprising pentetic acid pentalithium salt ($Li_5DTPA$) salt;
      hexadentate structures selected from the group consisting of hexalithium gluconate, hexasodium gluconate, tris(methylene phosphonic acid) hexalithium salt ($Li_6TMPA$), and combinations thereof; and
      an octadentate structure comprising octalithium ethylene diamine tetramethyl phosphate ($Li_8EDTMP$);
   wherein the polyamine is 2,2'-bis(salicylideneamino) azobenzene; and
   wherein the polymers functionalized with two or more functional groups are selected from the group consisting of carboxymethylated chitosan; carboxyethylated chitosan; poly(maleate, lithium salt-alternating-1-decene), 3-(dimethylamino)-1-propylamine; lignin, carboxymethylated lignin, carboxyethylated lignin, 2,3-dihydroxybenzoic acid, and combinations thereof.

2. The lithium ion battery as defined in claim 1 wherein the polymer of the nanoporous or microporous polymer separator is selected from the group consisting of polypropylene (PP), polyethylene (PE), a blend of PE and PP, multi-layered structured porous films of at least one of PE and PP, polyethylene terephthalate (PET), polyvinylidene fluoride (PVdF), polyamides, polyurethanes, polycarbonates, polyesters, polyetheretherketones (PEEK), polyethersulfones (PES), polyimides (PI), polyamide-imides, polyethers, polyoxymethylene, polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers, polybenzimidazole (PBI), polybenzoxazole (PBO), polyphenylenes, polyarylene ether ketones, polyperfluorocyclobutanes, polyvinylidene fluoride copolymers and terpolymers, polyvinylfluoride, polyaramides, polyphenylene oxide, cellulosic materials, meso-porous silica, and combinations thereof.

3. The lithium ion battery as defined in claim 1 wherein:
the thiol is N,N'-bis(2-mercaptoethyl)isophthalamide (BDTH$_2$);
the polymers functionalized with alkali metal salts of organic acids are selected from the group consisting of poly(ethylene-alt-maleic acid dilithium salt), poly(methyl vinyl ether-alternating-maleate, lithium salt), poly(ethylene-graft-maleate, lithium salt), poly(itaconate, lithium salt), copolymers of poly(itaconate, lithium salt), poly(isobutylene-alternating-maleate, lithium salt), poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), poly(styrene-block-poly(ethylene-random-butylene)-block-poly(styrene-graft-maleate), lithium salt), fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof; and
the polymers functionalized with nitrogen-containing functional groups are selected from the group consisting of linear polyethyleneimine, branched polyethyleneimine, carboxyethylated polyethyleneimine, carboxymethylated polyethyleneimine, bis-picolylamine functionalized polymer, poly(amidoamine) dendrimer, and combinations thereof.

4. The lithium ion battery as defined in claim 1 wherein the at least two different chelating agents are selected from the group consisting of poly(ethylene-alt-maleate), alkali metal salts of carboxymethylated chitosan, alkali metal salts of carboxyethylated chitosan, polyethyleneimine, alkali metal salts of carboxymethylated polyethyleneimine, alkali metal salts of carboxyethylated polyethyleneimine, lignin, and combinations thereof.

5. The lithium ion battery as defined in claim 1 wherein the at least two different chelating agents are selected from the group consisting of poly(ethylene-alt-maleic acid dilithium salt), natural lignin, chemically modified lignin, and combinations thereof.

6. The lithium ion battery as defined in claim 1 wherein the at least two different chelating agents are selected from the group consisting of poly(ethylene-alt-maleic acid dilithium salt), BPAP (bis-picolylamine functionalized polymer), polyethyleneimine, tetrasodium salt of ethylenediamine tetraacetic acid (EDTANa$_4$), and combinations thereof.

7. The lithium ion battery as defined in claim 1 wherein the transition metal ions comprise nickel ions, cobalt ions, chromium ions, manganese ions, iron ions, vanadium ions, and combinations thereof.

8. The lithium ion battery as defined in claim 7 wherein the transition metal ions include two or more of manganese ion cations in different oxidation states selected from the group consisting of $Mn^{+2}$, $Mn^{+3}$, and $Mn^{+4}$.

9. The lithium ion battery as defined in claim 8 wherein the at least two different chelating agents have approximately the same relative concentration ratio to each other as the manganese ions in two or more different oxidation states have to each other.

10. A lithium ion battery separator, comprising:
a nanoporous or microporous membrane; and
at least two different chelating agents, the at least two different chelating agents complex with: i) two or more different transition metal ions; ii) a transition metal ion in two or more different oxidation states; or iii) both i) and ii);
wherein the at least two different chelating agents are operatively disposed within pores of the membrane, tethered to a ceramic material of the membrane, grafted onto a polymer of the membrane as a substitute pendant group, or included as a filler material within a polymer separator matrix, the at least two different chelating agents to complex with transition metal ions in a manner sufficient to not affect movement of lithium ions across the separator during operation of the lithium ion battery;
wherein the at least two different chelating agents are selected from: ion traps in molecular form selected from the group consisting of: polyamines, thiols, alkali metal salts of organic acids, and combinations thereof; polymers functionalized with alkali metal salts of organic acids; polymers functionalized with nitrogen-containing functional groups; and polymers functionalized with two or more functional groups;
wherein the alkali metal salts of organic acids are multidentate structures selected from the group consisting of:
tridentate structures selected from the group consisting of trisodium citrate, nitrilotriacetic acid trilithium salt (Li$_3$NTA), nitrilotriacetic acid trisodium salt (Na$_3$NTA), N-(2-carboxyethyl)iminodiacetic acid trilithium salt, trilithium 1,4,7-triazacyclononane-1,4,7-trisacetic acid salt (Li$_3$NOTA), and combinations thereof;
tetradentate structures selected from the group consisting of tetralithium salt of 1,2-bis(o-aminophenoxy)ethane-N,N,N',N'-tetra acetic acid (Li$_4$BAPTA), tetralithium salt of 1,4,7,10-tetra aza cyclo dodecane-1,4,7,10-tetra acetic acid (Li$_4$DOTA), tetrasodium salt of ethylenediamine tetraacetic acid (EDTANa$_4$), ethyleneglycol-bis-(2-aminoethyl ether)-N,N, N', N'-tetra acetic acid tetralithium salt (Li$_4$EGTA), and combinations thereof; and
a pentadentate structure comprising pentetic acid pentalithium salt (Li$_5$DTPA) salt; hexadentate structures selected from the group consisting of hexalithium gluconate, hexasodium gluconate, tris(methylene phosphonic acid) hexalithium salt (Li$_6$TMPA), and combinations thereof; and
an octadentate structure comprising octalithium ethylene diamine tetramethyl phosphate (Li$_8$EDTMP);
wherein the polyamine is 2,2'-bis(salicylideneamino)azobenzene; and
wherein the polymers functionalized with two or more functional groups are selected from the group consisting of carboxymethylated chitosan; carboxyethylated chitosan; poly(maleate, lithium salt-alternating-1-decene), 3-(dimethylamino)-1-propylamine; lignin, carboxymethylated lignin, carboxyethylated lignin, 2,3-dihydroxybenzoic acid, and combinations thereof.

11. The lithium ion battery separator as defined in claim 10 wherein:
the polyamine is 2,2'-bis(salicylideneamino)azobenzene, and wherein the thiol is N,N'-bis(2-mercaptoethyl) isophthalamide ($BDTH_2$);
the polymers functionalized with alkali metal salts of organic acids are selected from the group consisting of poly(ethylene-alt-maleic acid dilithium salt), poly(methyl vinyl ether-alternating-maleate, lithium salt), poly(ethylene-graft-maleate, lithium salt, poly(itaconate, lithium salt), copolymers of poly(itaconate, lithium salt), poly(isobutylene-alternating-maleate, lithium salt), poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), poly(styrene-block-poly(ethylene-random-butylene)-block-poly(styrene-graft-maleate), lithium salt), fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof; and
the polymers functionalized with nitrogen-containing functional groups are selected from the group consisting of linear polyethyleneimine, branched polyethyleneimine, carboxyethylated polyethyleneimine, carboxymethylated polyethyleneimine, bis-picolylamine functionalized polymer, poly(amidoamine) dendrimer, and combinations thereof.

12. The lithium ion battery separator as defined in claim 10 wherein the at least two different chelating agents are selected from the group consisting of poly(ethylene-alt-maleate), alkali metal salts of carboxymethylated chitosan, alkali metal salts of carboxyethylated chitosan, polyethyleneimine, alkali metal salts of carboxymethylated polyethyleneimine, alkali metal salts of carboxyethylated polyethyleneimine, lignin, and combinations thereof.

13. The lithium ion battery separator as defined in claim 10 wherein the at least two different chelating agents are selected from the group consisting of poly(ethylene-alt-maleic acid dilithium salt), BPAP (bis-picolylamine functionalized polymer), polyethyleneimine, tetrasodium salt of ethylenediamine tetraacetic acid ($EDTANa_4$), and combinations thereof.

14. The lithium ion battery separator as defined in claim 10 wherein the transition metal ions comprise nickel ions, cobalt ions, manganese ions, iron ions, manganese ions in two or more different oxidation states selected from the group consisting of $Mn^{+2}$, $Mn^{+3}$, and $Mn^{+4}$, and combinations thereof.

15. The lithium ion battery separator as defined in claim 14 wherein the at least two different chelating agents have approximately the same relative concentration ratio to each other as the manganese ions in two or more different oxidation states have to each other.

16. A lithium ion battery, comprising:
a positive electrode including a binder material;
a negative electrode including a binder material;
a nanoporous or microporous polymer separator soaked in an electrolyte solution, the nanoporous or microporous polymer separator operatively disposed between the positive electrode and the negative electrode; and
at least two different chelating agents selected to complex with: i) two or more different transition metal ions; ii) a transition metal ion in two or more different oxidation states; or iii) both i) and ii);
wherein the at least two different chelating agents complex with transition metal ions in a manner sufficient to not affect movement of lithium ions across the nanoporous or microporous polymer separator during operation of the lithium ion battery;
wherein the at least two different chelating agents are at least one of: grafted onto the polymer of the nanoporous or microporous polymer separator as a substitute pendant group; attached to the binder material of the negative electrode; attached to the binder material of the positive electrode; coated on a surface of the separator; coated on a surface of the negative electrode; and coated on a surface of the positive electrode; and
wherein the at least two different chelating agents are selected from: alkali metal salts of organic acids, polymers functionalized with alkali metal salts of organic acids; and combinations thereof.

17. The lithium ion battery as defined in claim 16 wherein the alkali metal salts of organic acids are multi-dentate structures selected from the group consisting of:
tridentate structures selected from the group consisting of trisodium citrate, nitrilotriacetic acid trilithium salt ($Li_3NTA$), nitrilotriacetic acid tri sodium salt ($Na_3NTA$), N-(2-carboxyethyl)iminodiacetic acid trilithium salt, trilithium 1,4,7-triazacyclononane-1,4,7-trisacetic acid salt ($Li_3NOTA$), and combinations thereof;
tetradentate structures selected from the group consisting of tetralithium salt of 1,2-bis(o-aminophenoxy)ethane-N,N,N',N'-tetra acetic acid ($Li_4BAPTA$), tetralithium salt of 1,4,7,10-tetra aza cyclo dodecane-1,4,7,10-tetra acetic acid ($Li_4DOTA$), tetralithium salt of ethylenediamine tetraacetic acid ($EDTALi_4$), tetrasodium salt of ethylenediamine tetraacetic acid ($EDTANa_4$), ethyleneglycol-bis-(2-aminoethyl ether)-N, N, N', N'-tetra acetic acid tetralithium salt ($Li_4EGTA$), and combinations thereof;
a pentadentate structure comprising pentetic acid pentalithium salt ($Li_5DTPA$) salt;
hexadentate structures selected from the group consisting of hexalithium gluconate, hexasodium gluconate, $Li_6TMPA$ is tris(methylene phosphonic acid) hexalithium salt, and combinations thereof; and
an octadentate structure comprising octalithium ethylene diamine tetramethyl phosphate ($Li_8EDTMP$).

18. The lithium ion battery as defined in claim 16 wherein the polymers functionalized with alkali metal salts of organic acids are selected from the group consisting of poly(ethylene-alt-maleic acid dilithium salt), poly(methyl vinyl ether-alternating-maleate, lithium salt), poly(ethylene-graft-maleate, lithium salt), poly(itaconate, lithium salt), copolymers of poly(itaconate, lithium salt), poly(isobutylene-alternating-maleate, lithium salt), poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), polystyrene-block-poly(ethylene-random-butylene)-block-polystyrene-graft-maleate, lithium salt, fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof.

19. A method, comprising:
selecting at least two different chelating agents, the at least two different chelating agents capable of complexing with: i) two or more different transition metal ions; ii) a transition metal ion in two or more different oxidation states; or iii) both i) and ii);

wherein the at least two different chelating agents complex with transition metal ions in a manner sufficient to not affect movement of lithium ions across a nanoporous or microporous polymer separator during operation of a lithium ion battery, wherein the lithium ion battery includes:

a positive electrode;

a negative electrode;

the nanoporous or microporous polymer separator soaked in an electrolyte solution, the nanoporous or microporous polymer separator operatively disposed between the positive electrode and the negative electrode; and the at least two different chelating agents, wherein the at least two different chelating agents are at least one of: dissolved or dispersed in the electrolyte solution; grafted onto the polymer of the nanoporous or microporous polymer separator as a substitute pendant group; attached to a binder material of the negative electrode; attached to a binder material of the positive electrode; disposed within pores of the separator; coated on a surface of the separator; coated on a surface of the negative electrode; and coated on a surface of the positive electrode; and wherein the at least two different chelating agents are selected from: ion traps in molecular form selected from the group consisting of: polyamines, thiols, alkali metal salts of organic acids, and combinations thereof; polymers functionalized with alkali metal salts of organic acids; polymers functionalized with nitrogen-containing functional groups; and polymers functionalized with two or more functional groups;

wherein the alkali metal salts of organic acids are multi-dentate structures selected from the group consisting of:

tridentate structures selected from the group consisting of trisodium citrate, nitrilotriacetic acid trilithium salt ($Li_3NTA$), nitrilotriacetic acid trisodium salt ($Na_3NTA$), N-(2-carboxyethyl) iminodiacetic acid trilithium salt, trilithium 1,4,7-triazacyclononane-1,4,7-trisacetic acid salt ($Li_3NOTA$), and combinations thereof;

tetradentate structures selected from the group consisting of tetralithium salt of 1,2-bis(o-aminophenoxy)ethane-N,N,N',N'-tetra acetic acid ($Li_4BAPTA$), tetralithium salt of 1,4,7,10-tetra aza cyclo dodecane-1,4,7,10-tetra acetic acid ($Li_4DOTA$), tetrasodium salt of ethylenediamine tetraacetic acid ($EDTANa_4$), ethyleneglycol-bis-(2-aminoethyl ether)-N, N, N', N'-tetra acetic acid tetralithium salt ($Li_4EGTA$), and combinations thereof;

a pentadentate structure comprising pentetic acid pentalithium salt ($Li_5DTPA$) salt; hexadentate structures selected from the group consisting of hexalithium gluconate, hexasodium gluconate, tris (methylene phosphonic acid) hexalithium salt ($Li_6TMPA$), and combinations thereof; and an octadentate structure comprising octalithium ethylene diamine tetramethyl phosphate ($Li_8EDTMP$);

wherein the polyamine is 2,2'-bis(salicylideneamino) azobenzene; and wherein the polymers functionalized with two or more functional groups are selected from the group consisting of carboxymethylated chitosan; carboxyethylated chitosan; poly(maleate, lithium salt-alternating-1-decene), 3-(dimethylamino)-1-propylamine; lignin, carboxymethylated lignin, carboxyethylated lignin, 2,3-dihydroxybenzoic acid, and combinations thereof.

20. The method as defined in claim 19 wherein:

the polyamine is 2,2'-bis(salicylideneamino)azobenzene, and wherein the thiol is N,N'-bis(2-mercaptoethyl) isophthalamide ($BDTH_2$);

the polymers functionalized with alkali metal salts of organic acids are selected from the group consisting of poly(ethylene-alt-maleic acid dilithium salt), poly(methyl vinyl ether-alternating-maleate, lithium salt), poly (ethylene-graft-maleate, lithium salt), poly(itaconate, lithium salt), copolymers of poly(itaconate, lithium salt), poly(isobutylene-alternating-maleate, lithium salt), poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), poly(styrene-block-poly(ethylene-random-butylene)-block-poly(styrene-graft-maleate), lithium salt), fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof; and the polymers functionalized with nitrogen-containing functional groups are selected from the group consisting of linear polyethyleneimine, branched polyethyleneimine, carboxyethylated polyethyleneimine, carboxymethylated polyethyleneimine, bis-picolylamine functionalized polymer, poly(amidoamine) dendrimer, and combinations thereof.

21. The method as defined in claim 19 wherein the transition metal ions comprise nickel ions, cobalt ions, manganese ions, iron ions, manganese ions in two or more different oxidation states selected from the group consisting of $Mn^{+2}$, $Mn^{+3}$, and $Mn^{+4}$, and combinations thereof.

22. The method as defined in claim 21 wherein the at least two different chelating agents have approximately the same relative concentration ratio to each other as the manganese ions in two or more different oxidation states have to each other.

* * * * *